United States Patent
Yoshida et al.

(10) Patent No.: US 10,927,748 B2
(45) Date of Patent: Feb. 23, 2021

(54) FLOW PASSAGE DEVICE AND ENGINE COOLING SYSTEM

(71) Applicants: AISIN SEIKI KABUSHIKI KAISHA, Kariya (JP); TOYOTA JIDOSHA KABUSHIKI KAISHA, Toyota (JP)

(72) Inventors: Masafumi Yoshida, Kariya (JP); Naoto Yumisashi, Kariya (JP); Koji Nunami, Kariya (JP); Masahiro Yoshida, Kariya (JP); Hirotaka Watanabe, Kariya (JP); Takahiko Aoyagi, Kariya (JP); Noboru Takagi, Toyota (JP); Hirokazu Kato, Nissin (JP); Rihito Kaneko, Miyoshi (JP); Masaaki Yamaguchi, Okazaki (JP)

(73) Assignees: AISIN SEIKI KABUSHIKI KAISHA, Kariya (JP); TOYOTA JIDOSHA KABUSHIKI KAISHA, Toyota (JP)

(*) Notice: Subject to any disclaimer, the term of this patent is extended or adjusted under 35 U.S.C. 154(b) by 0 days.

(21) Appl. No.: 16/685,274

(22) Filed: Nov. 15, 2019

(65) Prior Publication Data
US 2020/0158000 A1     May 21, 2020

(30) Foreign Application Priority Data
Nov. 19, 2018   (JP) .............................. JP2018-216833

(51) Int. Cl.
*F01P 7/14*     (2006.01)
*F16K 15/03*    (2006.01)
(Continued)

(52) U.S. Cl.
CPC ................ *F01P 7/14* (2013.01); *F01P 7/164* (2013.01); *F16K 15/033* (2013.01); *F01P 5/10* (2013.01);
(Continued)

(58) Field of Classification Search
CPC .... F01P 7/14; F01P 2007/146; F01P 2025/06; F01P 2070/06; F01P 7/16; F01P 7/164;
(Continued)

(56) References Cited

U.S. PATENT DOCUMENTS

| 2,272,960 A | * | 2/1942 | Young, Jr. ............. F16K 1/2007 137/340 |
| 2003/0000582 A1 | * | 1/2003 | Jackson ................ F16K 15/033 137/527.6 |

(Continued)

FOREIGN PATENT DOCUMENTS

| JP | 2008544808 A | 12/2008 |
| JP | 2011179480 A | 9/2011 |
| WO | 2007005286 A2 | 1/2007 |

OTHER PUBLICATIONS

Lasse Scmidt, A Class of Energy Efficient Self-Contained Electro-Hydraulic Drives with Self-Locking Capability, May 16, 2019 (Year : 2019).*

*Primary Examiner* — Syed O Hasan
(74) *Attorney, Agent, or Firm* — Buchanan Ingersoll & Rooney PC

(57) ABSTRACT

A flow passage device includes a circulation flow passage, a swing valve provided in the circulation flow passage, an energizing part, and a lock mechanism including a lock pin. The lock pin is configured so as to hinder the swing valve from opening, and to allow the swing valve to open. The swing valve is configured so as to rotate from a first valve position to a second valve position. The lock mechanism is configured so as to set a locked state and to set an unlocked state. The lock pin is configured so as to protrude as being energized by pressure of the fluid on an upstream side of the swing valve, and to retract as being energized by pressure of the fluid on a downstream side of the swing valve.

7 Claims, 17 Drawing Sheets

(51) Int. Cl.
    *F01P 7/16*         (2006.01)
    *F01P 5/12*         (2006.01)
    *F01P 5/10*         (2006.01)
    *F16K 17/00*       (2006.01)

(52) U.S. Cl.
    CPC ........... *F01P 7/16* (2013.01); *F01P 2005/125* (2013.01); *F01P 2007/146* (2013.01); *F01P 2025/06* (2013.01); *F01P 2070/06* (2013.01); *F16K 17/003* (2013.01)

(58) Field of Classification Search
    CPC ..... F01P 5/10; F01P 2005/125; F16K 15/033; F16K 17/003
    USPC ...................................................... 123/41.08
    See application file for complete search history.

(56) References Cited

U.S. PATENT DOCUMENTS

2011/0214626 A1    9/2011    Watanabe et al.
2016/0061339 A1*  3/2016    Zellweger ............... F16K 15/03
                                                                   137/461

* cited by examiner

FLOW PASSAGE DEVICE AND ENGINE COOLING SYSTEM

INCORPORATION BY REFERENCE

The disclosure of Japanese Patent Application No. 2018-216833 filed on Nov. 19, 2018 including the specification, drawings and abstract is incorporated herein by reference in its entirety.

BACKGROUND

1. Technical Field

The disclosure relates to a flow passage device and an engine cooling system.

2. Description of Related Art

An engine of an automobile or the like needs appropriate cooling in order to avoid overheating. However, excessive cooling causes a problem that fuel consumption is deteriorated. Therefore, it is required that temperature of the engine is kept within an adequate temperature range.

In Japanese Unexamined Patent Application Publication No. 2011-179480 (JP 2011-179480 A), a cooling device for an internal combustion engine (an engine) is described. The cooling device includes a radiator that cools the engine, a feed flow passage and a return flow passage that allow a coolant to flow to the engine and the radiator, a thermostat device provided between the return flow passage and the engine, and a heater core inserted in an intermediate part of a flow path that is branched from the feed flow passage, receives supply of the coolant, and returns the coolant to the thermostat device. In the cooling device, in order to improve fuel consumption of the engine, temperature of the coolant returned to the engine is controlled by the thermostat device.

The thermostat device described in JP 2011-179480 A includes a thermoelement, a piston, a flow hole, a valve seat, and a valve body. The thermoelement includes a wax (a thermally expanding body) that expands and contracts in response to temperature of the coolant. The piston extends as the wax expands. The flow hole communicates with the return flow passage, the valve seat is provided in the flow hole, and the valve body comes into contact with the valve seat and closes. The valve body is energized by a spring member in a valve closing direction. As the piston extends, the valve body moves in a direction away from the valve seat and the valve body is thus opened.

In this cooling device, when temperature of the coolant is low, the valve body is kept in a valve closed state in which the valve body is energized by the spring member and is brought into contact with the valve seat. Therefore, the coolant does not flow in the radiator, and the coolant is not cooled. As temperature of the coolant increases, the thermally expanding body integrated in the thermoelement of the thermostat device expands. Then, the piston extends, and the valve body moves and is opened. Because of this, the coolant flows in the radiator and the coolant is cooled. In this way, temperature of the coolant is adjusted.

SUMMARY

With a conventional cooling device such as the one described in JP 2011-179480 A, the thermostat device is able to adjust temperature of the coolant. However, because the thermostat device described as an example requires an actuator like a thermoelement, its size increases and the structure becomes complex. When a heat sensitive body such as wax is used for the actuator, the valve body cannot be opened or closed at arbitrary coolant temperature.

The disclosure enables a valve body to operate with a simple structure and also at arbitrary coolant temperature.

A first aspect of the disclosure is a flow passage device. The flow passage device includes a circulation flow passage in which a fluid flows, a swing valve provided in the circulation flow passage, an energizing part, and a lock mechanism including a lock pin. The energizing part is configured to energize the swing valve to a valve closing direction against fluid differential pressure between upstream of the swing valve and downstream of the swing valve in the circulation flow passage. The swing valve is configured so as to open due to the fluid differential pressure between the upstream of the swing valve and the downstream of the swing valve, and to open and rotate to a downstream side. The lock pin is configured so as to protrude into a rotation region of the swing valve and hinder the swing valve from opening, and the lock pin is configured so as to retract from the rotation region of the swing valve such that swing valve is allowed to open. The swing valve is configured so as to rotate from a first valve position to a second valve position. The first valve position is a position at which the lock mechanism is able to hinder the swing valve from opening, and the second valve position is a position at which the swing valve is open more than the first valve position and the lock mechanism is not able to hinder the swing valve from opening. The lock mechanism is configured so as to set a locked state and set an unlocked state. The locked state is a state in which the lock pin is protruded to a locked position at which the lock pin overlaps the rotation region. The unlocked state is a state in which the lock pin is retracted to an unlocked position at which the lock pin does not overlap the rotation region. The lock pin is configured so as to protrude as being energized by pressure of the fluid on an upstream side of the swing valve, and to retract as being energized by pressure of the fluid on the downstream side of the swing valve.

With the above configuration, when the fluid differential pressure between the upstream of the swing valve and the downstream of the swing valve reaches given pressure, force applied to the swing valve due to the fluid differential pressure exceeds energizing force of the energizing part, and the swing valve is able to open.

With the above configuration, the lock pin protrudes to the locked position or retracts to the unlocked position in accordance with a balance of the fluid differential pressure between the upstream of the swing valve and the downstream of the swing valve. As the lock pin protrudes and retracts, the lock mechanism can be set to the locked state and the unlocked state. When the swing valve is at the first valve position, it is possible to set the lock mechanism to the locked state. Thus, it is possible to prevent the swing valve from opening. Meanwhile, once the lock mechanism is set to the unlocked state, it is possible to open the swing valve from the first valve position to the second valve position as the fluid differential pressure between the upstream of the swing valve and the downstream of the swing valve is adjusted.

This means that, with the above configuration, the swing valve opens and closes in accordance with the fluid differential pressure between the upstream of the swing valve and the downstream of the swing valve, and the lock mechanism is set to the locked state or the unlocked state in accordance with the fluid differential pressure between the upstream of the swing valve and the downstream of the swing valve. Thus, it is possible to prevent the swing valve from opening or allow the swing valve to open. Hence, it is possible to provide a flow passage device that is able to operate with a simple configuration and also at arbitrary coolant temperature.

A second aspect of the disclosure is an engine cooling system. The engine cooling system includes a circulation flow passage, a bypass flow passage, a swing valve, an energizing part, and a lock mechanism. In the circulation flow passage, a fluid is allowed to circulate between an engine and a radiator by a pump. The bypass flow passage is connected with the circulation flow passage. The swing valve is provided between the radiator and the bypass flow passage in the circulation flow passage. The energizing part is configured to energize the swing valve in the valve closing direction against fluid differential pressure between upstream of the swing valve and downstream of the swing valve in the circulation flow passage. The lock mechanism includes a lock pin. The bypass flow passage bypasses the radiator. The swing valve is configured so as to open due to the fluid differential pressure between the upstream of the swing valve and the downstream of the swing valve, and rotate and open to a downstream side. The lock pin is configured so as to protrude into a rotation region of the swing valve and thus hinder the swing valve from opening, and the lock pin is configured so as to retract from the rotation region of the swing valve such that the swing valve is allowed to open. The swing valve is configured so as to rotate from a first valve position to a second valve position. The first valve position is a position at which the lock mechanism is able to hinder the swing valve from opening. The second valve position is a position at which the swing valve is open more than the first valve position and the lock mechanism is not able to hinder the swing valve from opening. The lock mechanism is configured so as to set a locked state and to set an unlocked state. The locked state is a state in which the lock pin is protruded to a locked position where the lock pin overlaps the rotation region. The unlocked state is a state in which the lock pin is retracted to an unlocked position at which the lock pin does not overlap the rotation region. The lock pin is configured so as to protrude as being energized by pressure of the fluid on an upstream side of the swing valve, and to retract as being energized by pressure of the fluid on the downstream side of the swing valve.

With the foregoing configuration, once the fluid differential pressure between the upstream of the swing valve and the downstream of the swing valve reaches given pressure, force applied to the swing valve due to the fluid differential pressure exceeds energizing force of the energizing part, and the swing valve is thus able to open.

With the foregoing configuration, the lock pin protrudes to the locked position or retracts to the unlocked position in accordance with a balance of the fluid differential pressure between the upstream of the swing valve and the downstream of the swing valve. Because the lock pin protrudes and retracts, it is possible to set the lock mechanism to the locked state and the unlocked state. When the swing valve is located at the first valve position, the lock mechanism is set to the locked state, thereby preventing the swing valve from opening. Meanwhile, when the lock mechanism is set to the unlocked state, it is possible to open the swing valve from the first valve position to the second valve position by an adjustment of the fluid differential pressure between the upstream of the swing valve and the downstream of the swing valve.

This means that, with the above configuration, the swing valve opens and closes in accordance with the fluid differential pressure between the upstream of the swing valve and the downstream of the swing valve, and the lock mechanism is set to the locked state or the unlocked state in accordance with the fluid differential pressure between the upstream of the swing valve and the downstream of the swing valve so that the swing valve is prevented from opening or allowed to open.

With the above configuration, the engine cooling system achieves actions and effects similar to those of the flow passage device described earlier.

BRIEF DESCRIPTION OF THE DRAWINGS

Features, advantages, and technical and industrial significance of exemplary embodiments of the disclosure will be described below with reference to the accompanying drawings, in which like numerals denote like elements, and wherein.

DETAILED DESCRIPTION OF EMBODIMENTS

Hereinafter, a flow passage device and an engine cooling system according to an embodiment of the disclosure are described.

Figure 1:
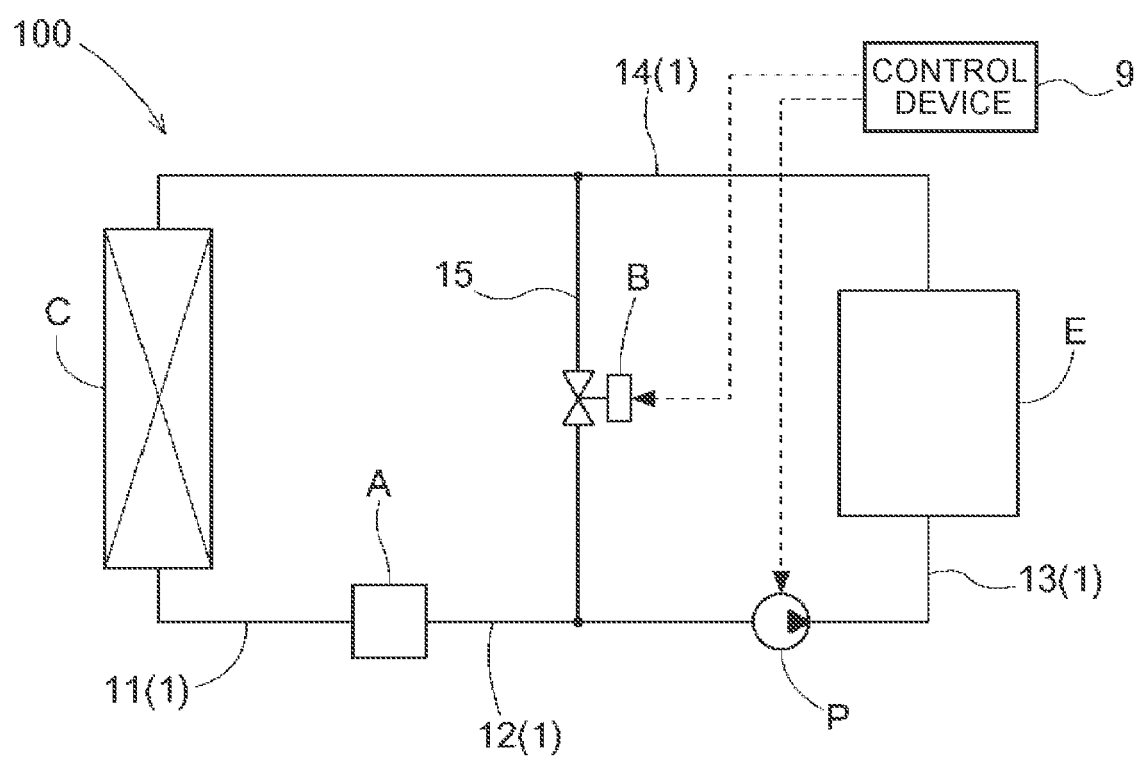
FIG. 1 is a schematic block diagram of an engine cooling system.

As shown in FIG. 1, an engine cooling system 100 according to the embodiment includes a radiator C, a circulation flow passage 1, a pump part P, a valve device A, a bypass flow passage 15, a valve B, and a control device 9. The radiator C cools an engine E that is an internal combustion engine of an automobile or the like. The circulation flow passage 1 is a flow passage that allows a coolant (a fluid) to circulate between the radiator C and the engine E. The pump part P is provided in the circulation flow passage 1 and has a pump function of sucking and delivering the coolant. The valve device A is a flow passage device that controls a flow of the coolant to the radiator C. The bypass flow passage 15 allows the coolant to bypass the radiator C and circulate to the engine E. The valve B is provided in the bypass flow passage 15. The control device 9 control outputs as well as opening and closing of the pump part P and the valve B.

In the circulation flow passage 1, based on the pump part P, the engine E, the radiator C, the valve device A, and the pump part P are arranged in this order towards a downstream side in a flow direction of the coolant delivered from the pump part P. The circulation flow passage 1 includes a flow passage 13, a flow passage 14, an inlet circulation flow passage 11, and an outlet circulation flow passage 12. The flow passage 13 allows the pump part P and the engine E to communicate with each other. The flow passage 14 allows the engine E and the radiator C to communicate with each other. The inlet circulation flow passage 11 allows the radiator C and the valve device A to communicate with each other. The outlet circulation flow passage 12 allows the valve device A and the pump part P to communicate with each other.

The control device 9 is a central controller such as a CPU that controls operations of the engine cooling system 100. When the engine E is mounted on an automobile, the control device 9 may be included in an engine control unit. The control device 9 sends commands for setting an output of the pump part P (for example, the number of rotations), opening and closing of the valve B (an opened state, a closed state, or an opening) to the pump part P and the valve B. Hereinafter, the control device 9 sending commands regarding outputs and opening and closing to the pump part P and the valve B is sometimes described simply as the control device 9 controlling the pump part P and the valve B.

The pump part P is, for example, a fluid pump such as a turbine pump. The pump part P sucks and delivers the coolant in accordance with the number of rotations of a motor or the like that causes blades of the pump part P to rotate. The pump part P sucks the coolant from the outlet circulation flow passage 12 and delivers the coolant to the flow passage 13. Because of that, the coolant circulates between the engine E and the radiator C, or between the engine E and the bypass flow passage 15.

The radiator C is a heat exchanger that cools the coolant with temperature that has increased due to cooling of the engine E. The radiator C cools the coolant by releasing heat energy of the coolant to air and so on through heat conduction.

The bypass flow passage 15 allows the flow passage 14 and the outlet circulation flow passage 12 to communicate with each other. The bypass flow passage 15 allows the coolant to bypass the radiator C and circulate from the flow passage 14 to the outlet circulation flow passage 12 (hereinafter, referred to as bypass). The bypass flow passage 15 includes the valve B that permits the coolant to bypass, adjusts a bypass amount, and blocks the coolant to bypass. A heat exchanger or the like may be provided in the bypass flow passage 15 for indoor heating of an automobile.

Figure 2:
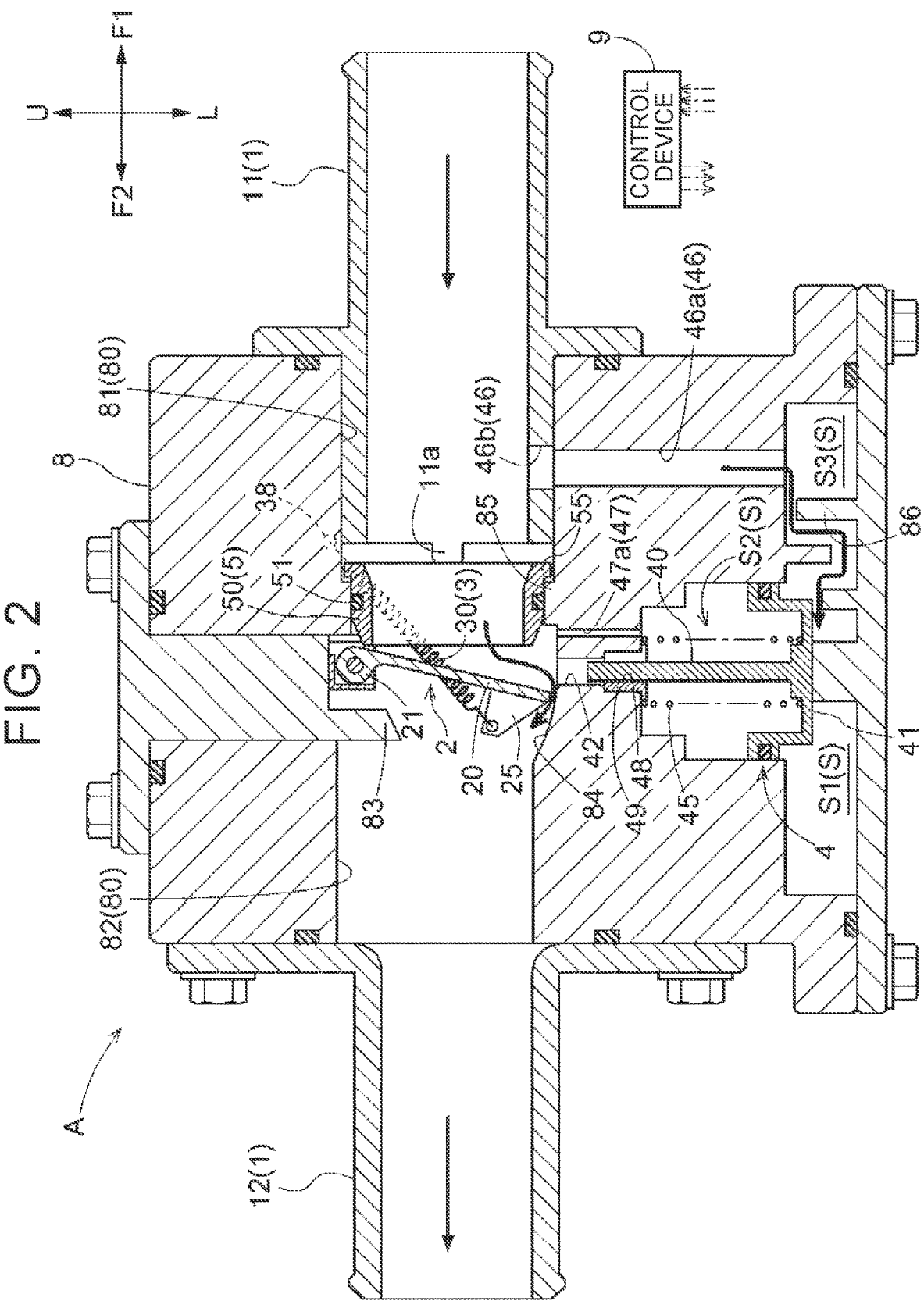
FIG. 2 is a sectional view of the entire configuration of a valve device.
Figure 3:
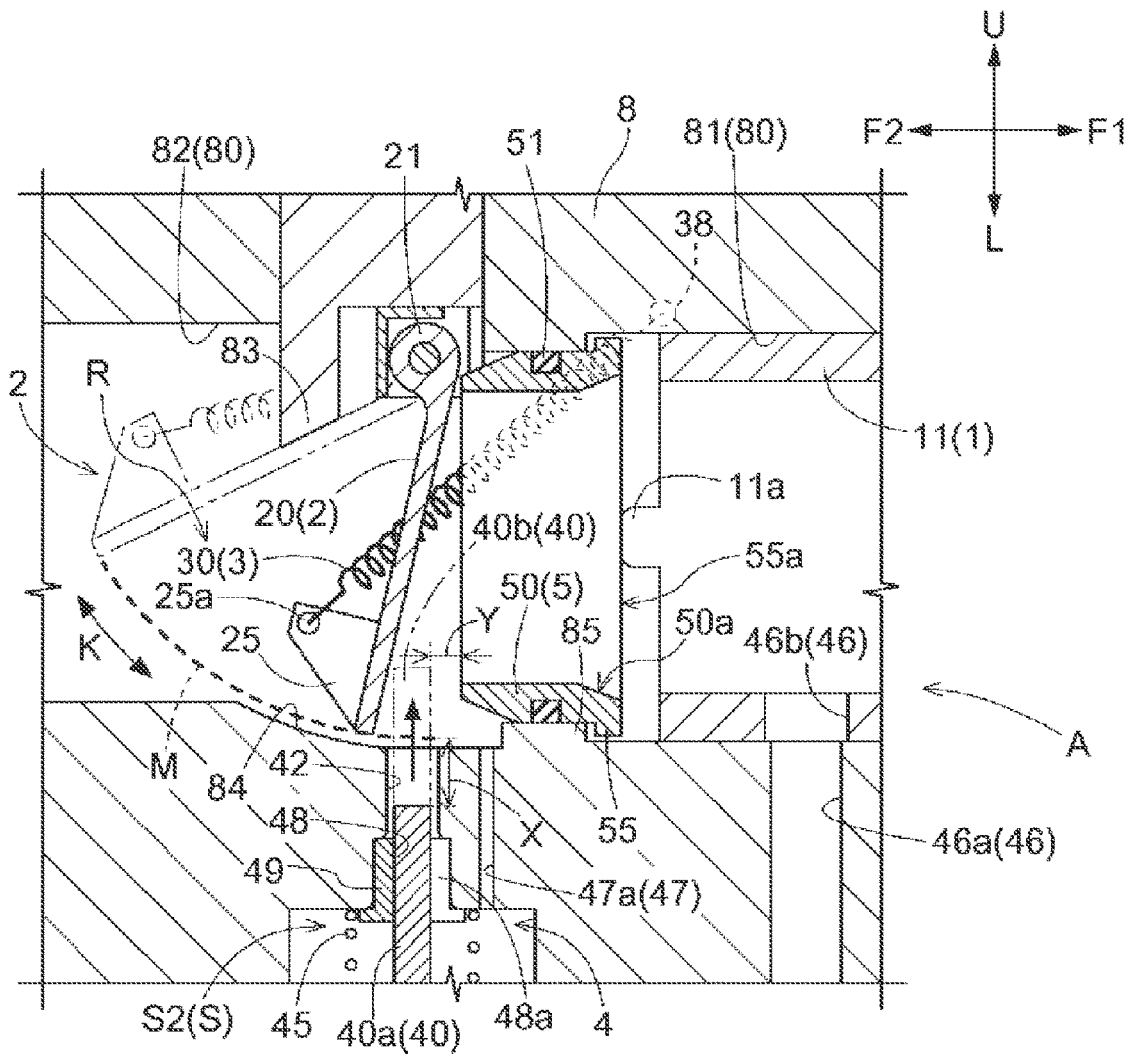
FIG. 3 is a vertical sectional view of a vicinity of a valve body.

As shown in FIG. 2 and FIG. 3, the valve device A is a flow passage device having a valve function of controlling a flow of the coolant to the radiator C in accordance with the commands from the control device 9. The valve device A is a check valve that permits the coolant to flow in one direction (a direction from the inlet circulation flow passage 11 towards the outlet circulation flow passage 12) and prevents the coolant from flowing backward. The valve device A includes a valve element 2, a valve seat 5, a lock mechanism 4, an energizing part 3, and a body 8. The valve element 2 is provided in the flow passage 80 in which the coolant flows, and is rotated and opened in the one direction. The valve seat 5 is arranged on an upstream side of the valve element 2 in the flow passage 80. The lock mechanism 4 permits or blocks opening of the valve element 2. The energizing part 3 energizes the valve element 2 in the valve closing direction. The body 8 is a casing that houses the flow passage 80, the valve element 2, and so on. FIG. 2 is a vertical sectional view of the valve device A and shows a section passing the center of the flow passage 80 along a rotating direction of the valve element 2.

Hereinafter, in FIG. 2 and FIG. 3, a direction denoted by reference numeral F1 is referred to as a rear direction, and a direction denoted by reference numeral F2 that is opposite to the direction F1 is referred to as a front direction. The directions F1 and F2 are in an extending direction of the flow passage 80. Further, a direction denoted by reference numeral U is referred to as an upper direction, and a direction denoted by reference numeral L that is the opposite to the direction U is referred to as a lower direction. The rear side and the front side in the extending direction of the flow passage 80 correspond to the upstream side and a downstream side of the coolant flowing in the flow passage 80, respectively. The rear side and the front side in the extending direction of the flow passage 80 do not necessarily coincide with the upstream side and the downstream side, respectively, of the coolant flowing inside the valve device A.

The flow passage 80 is a flow passage formed inside the body 8 for the coolant. The flow passage 80 penetrates the body 8 in the front-rear direction. Hereinafter, the flow passage 80 on the rear side (the upstream side) of the valve element 2 in a closed state is defined as an inlet flow passage 81. Further, the flow passage 80 on the front side (the downstream side) of the inlet flow passage 81 is defined as an outlet flow passage 82.

The inlet flow passage 81 is connected with the inlet circulation flow passage 11. In this embodiment, a tube of the inlet circulation flow passage 11 is fitted into a tubular space of the inlet flow passage 81. Thus, the inlet flow passage 81 and the inlet circulation flow passage 11 are connected with each other.

The outlet flow passage 82 is connected with the outlet circulation flow passage 12. In this embodiment, the outlet flow passage 82 and the outlet circulation flow passage 12 are connected through a flange. In the outlet flow passage 82, an adjacent wall portion 84 is formed as described later.

Figure 4:
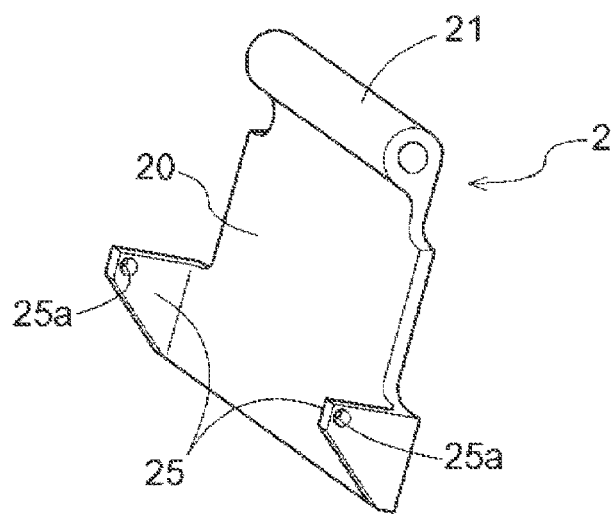
FIG. 4 is a perspective view of the valve body.

The valve element 2 is a valve that permits or blocks a flow of the coolant from the inlet flow passage 81 to the outlet flow passage 82. The valve element 2 is a swing valve that is energized towards the inlet flow passage 81, comes into contact with the valve seat 5, and thus blocks the flow of the coolant. The valve element 2 also permits a flow of the coolant by opening from the valve seat 5 into an inside space of the outlet flow passage 82. As shown in FIG. 4, the valve element 2 includes a valve body 20, a rotating shaft part 21 provided in the valve body 20, and a connecting part 25 that is connected with an elastic member 30. In this embodiment, the valve body 20 is formed into an almost rectangular plate shape. Hereinafter, a state where the valve element 2 is in contact with the valve seat 5 is referred to as the valve closed state. Meanwhile, a state where the valve element 2 is distanced from the valve seat 5 is referred to as a valve opened state.

As shown in FIG. 3, the rotating shaft part 21 is a bearing device including a bearing, a shaft pin, and so on in order to pivotally support the valve body 20 on the body 8 (inside the outlet flow passage 82). In this embodiment, the rotating shaft part 21 is a bearing into which a shaft pin provided in the body 8 (inside the outlet flow passage 82) is inserted so that the valve body 20 is pivotally supported and is able to rotate. The rotating shaft part 21 is attached onto a tube wall of the outlet flow passage 82 in a rotatable manner as a shaft pin or the like is inserted into the rotating shaft part 21. A direction in which the rotating shaft part 21 rotates is the rotating direction. In FIG. 3, the rotating direction is shown by reference numeral K. The rotating shaft part 21 is formed in one end of the valve body 20. The rotating shaft part 21 is provided so that its rotating axis is in a direction intersecting with a tube axis direction of the flow passage 80. The rotating shaft part 21 permits the valve body 20 to be distanced from the valve seat 5 and open towards the downstream side. In other words, the rotating shaft part 21 permits the valve to open. Hereinafter, the valve body 20 being distanced from the valve seat 5 and opening towards the downstream side is described simply as valve opening, and the other way around is described as valve closing. FIG. 2 and FIG. 3 show a case where the rotating shaft part 21 is attached to the tube wall of the outlet flow passage 82 on the upper side.

Figure 5:
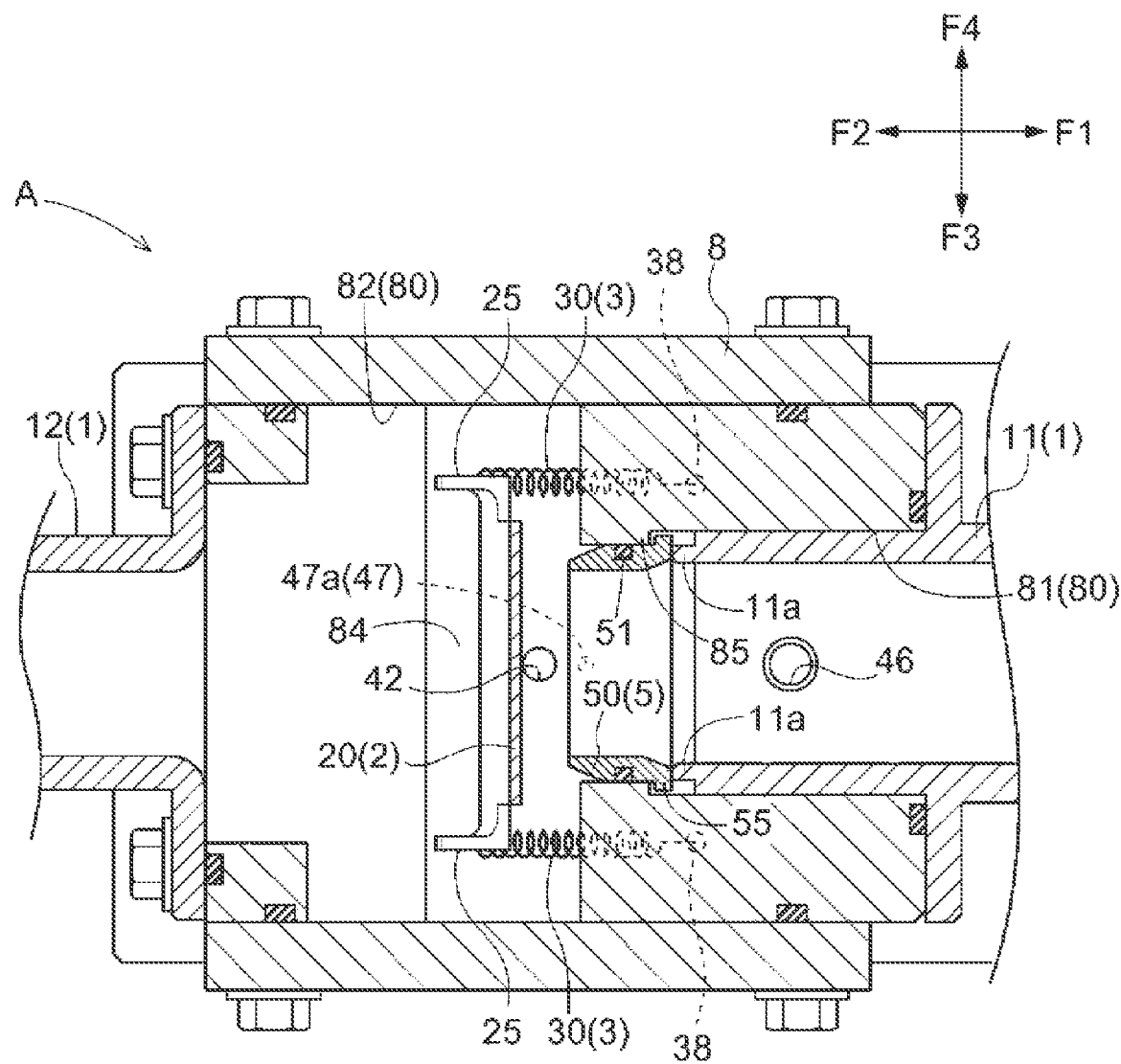
FIG. 5 is a horizontal sectional view of the vicinity of the valve body.

As shown in FIG. 2 to FIG. 5, the connecting part 25 is a portion for connecting the energizing part 3. FIG. 5 is a horizontal section of the valve device A near the valve element 2, and is a sectional view that is taken along the center of the inlet circulation flow passage 11 and is parallel to the rotating shaft part 21 of the valve element 2. In FIG. 5, reference numerals F1 and F2 are the same as those in FIG. 1 and so on. Reference numerals F4 and F3 indicate the right side and the left side towards the front side in the extending direction of the flow passage 80. In the following drawings, definitions of the reference numerals F1 to F4 are the same as those in FIG. 1 and FIG. 5, and description is thus omitted.

As shown in FIG. 3 and FIG. 4, in this embodiment, the connecting part 25 is provided in the valve body 20 at a position displaced to an end side of the valve body 20 opposite from the rotating shaft part 21. The connecting part 25 is provided as a pair on both side portions in the rotating direction, respectively. The connecting parts 25 are provided so as to extend in a rib shape from the both side portions, respectively, towards the rotating direction. Each of the connecting parts 25 includes, for example, an engaging hole for connecting the elastic member 30.

As shown in FIG. 2, FIG. 3, and FIG. 5, the energizing part 3 includes an elastic member 30 and a pivotally connecting part 38. The elastic member 30 is a tension spring-type coil spring, and so on. The pivotally connecting part 38 allows the elastic member 30 to be pivotally connected with the body 8.

The energizing part 3 energizes the valve element 2 towards the inlet flow passage 81 with energizing force of the elastic member 30. As shown in FIG. 5, in this embodiment, the energizing part 3 includes a pair of the coil springs as the elastic members 30, and energizes the valve element 2 towards the inlet flow passage 81 with use of contraction force of the coil springs. Further, the energizing part 3 has a pair of the pivotally connecting parts 38.

The pivotally connecting parts 38 are provided outside the tube wall of the inlet flow passage 81 and on both outer sides of the inlet flow passage 81 on the right and left sides, respectively. As the pivotally connecting parts 38 are arranged outside the tube wall of the inlet flow passage 81, it is possible to reduce flow resistance (a pressure loss) of the coolant. The pivotally connecting parts 38 are attached to a vicinity of the tube wall of the inlet flow passage 81 (that is the upstream side of the valve element 2) on the upper side. Because the pivotally connecting parts 38 are arranged on the upstream side of the valve element 2, it is possible to appropriately secure a region for the valve element 2 to rotate on the downstream side of for the valve element 2. This makes it possible to reduce the size of the valve device A. Further, since it is possible to appropriately secure the region for the valve element 2 to rotate, it is possible to increase opening of the valve element 2 as necessary and reduce flow resistance of the coolant. Each of the pivotally connecting parts 38 is, for example, a hole, and a hook formed in a second end of the coil spring serving as the elastic member 30 is hooked on the hole.

As shown in FIG. 2, FIG. 3, and FIG. 5, a first end of each of the coil springs is connected with each of the connecting parts 25. In this embodiment, the first end of each of the coil springs is connected with a connecting hole 25a formed in each of the connecting parts 25 (see FIG. 4). The second end of each of the coil springs is connected with each of the pivotally connecting parts 38. In this embodiment, the pivotally connecting parts 38 are arranged on the rear side of the connecting parts 25, respectively, in the extending direction of the flow passage 80.

Figure 6:
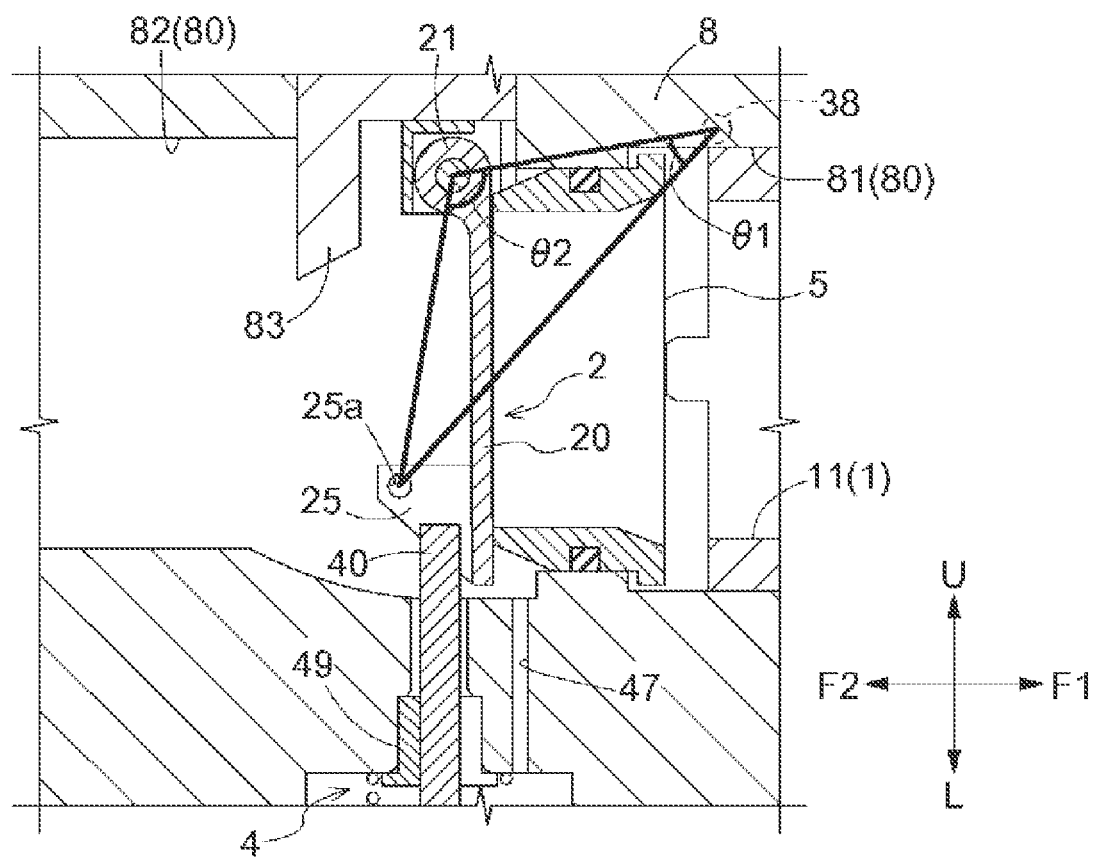
FIG. 6 is a view describing a positional relation among the valve body, a rotating bearing part, a connecting part, and the pivotally connecting part at valve closing time.

Because the rotating shaft part 21, the connecting parts 25, and the pivotally connecting parts 38 are arranged as described above, the rotating shaft part 21, each of the connecting parts 25, and each of the pivotally connecting parts 38 form a triangle in which the connecting part 25 is one of its vertices. As shown in FIG. 6, in this embodiment, the rotating shaft part 21, the connecting parts 25, and the pivotally connecting parts 38 are arranged so that an angle θ1 formed at the pivotally connecting part 38 as a vertex becomes 90 degrees or smaller in the valve closed state. Thus, as the valve element 2 opens, the angle θ1 becomes smaller, and the rotating shaft part 21, the connecting part 25, and the pivotally connecting part 38 are aligned almost linearly. Thus, with regard to valve closing torque acting on the valve element 2 from the elastic member 30 (torque generated when the valve element 2 is energized towards a valve closing side), torque when the valve element 2 is closed (hereinafter, sometimes referred to as valve closing time) is maximum torque. Torque generated when the valve element 2 is open (hereinafter, sometimes referred to as valve opening time) can be smaller than torque at the valve closing time.

Figure 7:
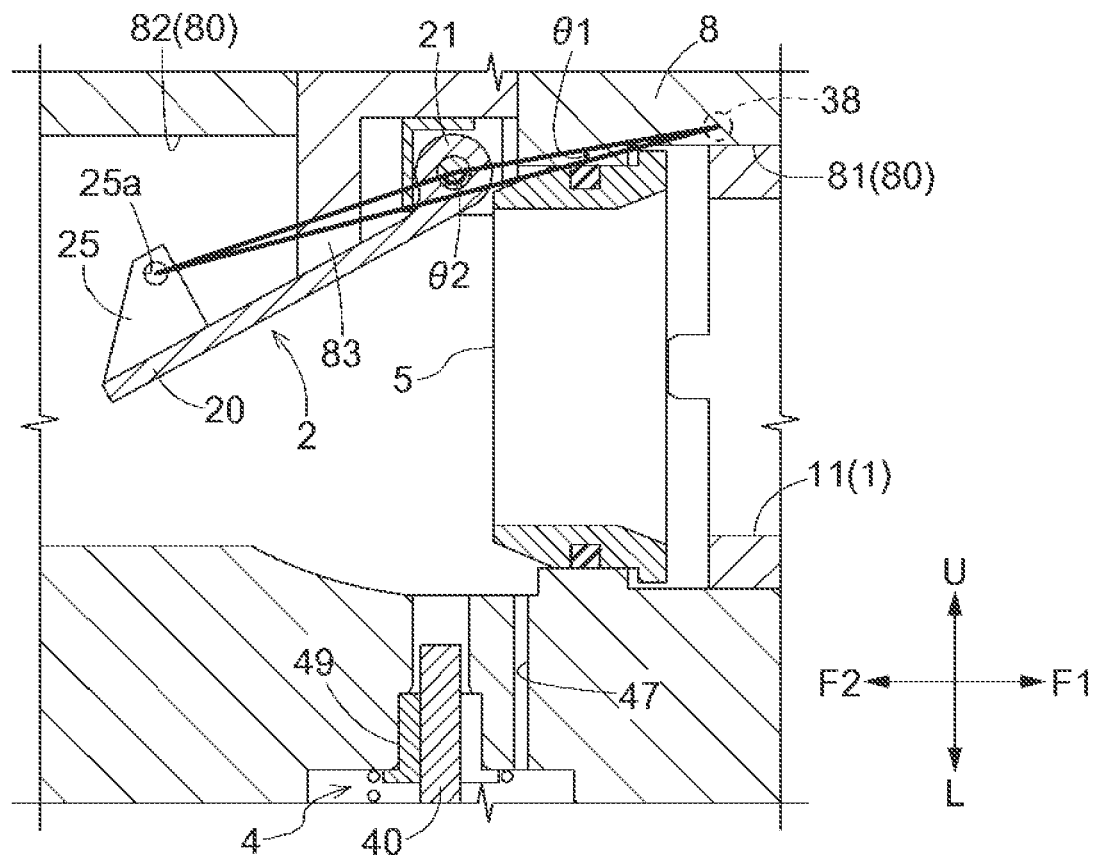
FIG. 7 is a view describing a positional relation among the valve body, the rotating bearing part, the connecting part, and the pivotally connecting part at valve opening time.

Valve opening of the valve element 2 is described. As shown in FIG. 7, the valve element 2 opens when pressure of the coolant inside the inlet flow passage 81 becomes higher than pressure of the coolant inside the outlet flow passage 82 by a given value or higher. To be more specific, the valve element 2 opens when energizing force in a valve opening direction (towards the downstream side in the flow direction) applied to the valve element 2 due to a pressure difference between the coolant inside the inlet flow passage 81 and the coolant inside the outlet flow passage 82 exceeds energizing force applied by the energizing parts 3 in the valve closing direction.

In this embodiment, the valve element 2 opens when a difference in fluid pressure becomes equal to or exceeds first pressure. The difference in fluid pressure is obtained by subtracting pressure of the coolant inside the outlet flow passage 82 from the pressure of the coolant inside the inlet flow passage 81 (the inlet circulation flow passage 11) (fluid differential pressure; hereinafter, referred to as a differential pressure before and after a flow passage). After the valve element 2 opens, the valve element 2 remains opened when a difference in fluid pressure exceeds the first pressure. The difference in fluid pressure is obtained by subtracting pressure of the coolant on the downstream side of the valve element 2 from pressure of the coolant on the upstream side of the valve element 2 (a so-called pressure loss; hereinafter, referred to as a differential pressure before and after the valve). The differential pressure before and after the valve at the valve closing time of the valve element 2 is equal to the differential pressure before and after the flow passage. As described above, valve closing torque acting on the valve element 2 from the elastic member 30 becomes the greatest at the valve closing time, and torque at the valve opening time is smaller than torque at the valve closing time. Therefore, it is possible to reduce the differential pressure before and after the valve (the pressure loss) when the valve element 2 is maintained open.

The valve element 2 opens to a degree until the valve body 20 comes into contact with a projecting locking part 83 extending to an inside from an upper tube wall part of the outlet flow passage 82 on the downstream side of the valve element 2. This means that the valve element 2 is able to rotate in a range from the valve closed state until coming into contact with the locking part 83. Hereinafter, the state where the valve element 2 is in contact with the locking part 83 is described as maximum valve opening time. Hereinafter, the range (region) in which the valve element 2 is able to rotate, in other words, an inner side region of a locus of the valve element 2 when the valve element 2 rotates, is described as a rotation region. The locus of the valve element 2 when the valve element 2 rotates means a locus of an end portion of the valve body 20 farthest from the rotating shaft part 21 (hereinafter, referred to as an endmost portion) when the endmost portion rotates. Hereinafter, this locus will be simply referred to as a rotation locus of the valve element 2. In FIG. 3, a rotation locus is shown by a broken line denoted by reference numeral M. Further, in FIG. 3, the inner side region of the rotation locus of the valve element 2 is denoted by reference numeral R.

As shown in FIG. 7, at the maximum valve opening time of the valve element 2, the rotating shaft part 21, the connecting part 25, and the pivotally connecting part 38 are arranged so as to form an obtuse triangle. Because of this, valve closing torque at the maximum valve opening time is reduced so as to be smaller than that at the valve closing time or the valve opening time (excluding the maximum valve opening time). In other words, the valve closing torque becomes minimum at the maximum valve opening time. In this embodiment, the rotating shaft part 21, the connecting part 25, and the pivotally connecting part 38 are arranged so as to form a triangle in which an angle θ2 becomes an obtuse angle. The angle θ2 is formed at the rotating shaft part 21 as a vertex.

As described above, the adjacent wall portion 84 is formed in the outlet flow passage 82 as shown in FIG. 3 and so on. The adjacent wall portion 84 is formed along the rotation locus of the valve element 2. As the adjacent wall portion 84 is formed in the outlet flow passage 82, the differential pressure before and after the valve increases when the valve element 2 is open. In this embodiment, a distance between the endmost portion of the valve element 2 and the adjacent wall portion 84 is maintained almost constant until the valve element 2 rotates up to a given rotation angle (for example 30°) from the valve closing time. The endmost portion of the valve element 2 moves away from the tube wall (the adjacent wall portion 84) of the outlet flow passage 82 when the valve element 2 rotates further from the given rotation angle. Because of this, when the valve element 2 in the valve opened state is within a range up to the given rotation angle from the valve closing time, it is possible to maintain high differential pressure before and after the valve. Therefore, variation of the opening of the valve element 2 becomes large for different amounts of a flow of the coolant (sensibility of the rotation angle for an amount of a flow of the coolant becomes high). As are result, it is possible to allow the valve element 2 to pass through the lock mechanism quickly. Further, it becomes easier to adjust the opening within the range of the rotation angle, and an amount of the flow of the coolant that passes the valve element 2. Meanwhile, when the valve element 2 in the valve opened state is opened beyond the given rotation angle from the valve closing time, it is possible to reduce the differential pressure before and after the valve with respect to an amount of the flow of the coolant. Therefore, it is possible to reduce power of the pump part P.

As shown in FIG. 3, the valve seat 5 is a seal member that seals the inlet flow passage 81 as the valve element 2 comes in to contact with the valve seat 5. The valve seat 5 is fitted to the inner side of the inlet flow passage 81 along the tube wall of the inlet flow passage 81. The valve seat 5 includes a sleeve 50, a seal ring 51, and an annular rib 55. A front side end portion of the sleeve 50 comes into pressure contact with the valve element 2. The seal ring 51 is fitted in an outer periphery of the sleeve 50. The annular rib 55 is provided in a rear end portion (a rear side end portion) of the sleeve 50 and extends to an outer side in a radial direction of the sleeve 50.

The front side end portion of the sleeve 50 comes into close contact with the valve element 2, thereby sealing the inlet flow passage 81. The sleeve 50 is formed so that an outer diameter of the sleeve 50 is slightly smaller than an inner diameter of the inlet flow passage 81. Thus, the sleeve 50 is able to slide in the extending direction of the flow passage 80.

A surface of the sleeve 50 on the rear side (the upstream side) is integrated with a rear end surface of the later-described annular rib 55, and forms an end surface 55a that is a surface perpendicular to the extending direction of the flow passage 80.

An inclined surface 50a is formed on an inner side of the rear side end portion of the sleeve 50. On the inclined surface 50a, a diameter is reduced in a tapered shape. The end surface 55a and the inclined surface 50a function as a pressure receiver that receives pressure of the coolant inside the inlet flow passage 81. Thus, the sleeve 50 is energized towards the downstream side, and pressed tightly against the valve element 2, thereby ensuring sealing of the inlet flow passage 81.

The annular rib 55 is a stopper structure that prevents the sleeve 50 from moving to the downstream side and coming off from the inlet flow passage 81. On an inner surface of the inlet flow passage 81, a step portion 85 is provided. In the step portion 85, a diameter is reduced in a step shape from the upstream side (the rear side) towards the downstream side (the front side). When the sleeve 50 moves to the downstream side by a given amount, a surface of the annular rib 55 on the downstream side comes into contact with the step portion 85. This hinders the valve seat 5 from coming off from the inlet flow passage 81. On the distal end side (the upstream side) of the sleeve 50, a surface of the annular rib 55 on the upstream side is able to come into contact with a distal end portion (a front side end portion) of the inlet circulation flow passage 11 that is fitted into the inlet flow passage 81.

In this embodiment, a pair of right and left projecting portions 11a is provided in the distal end portion of a tube of the inlet circulation flow passage 11. The projecting portions 11a serve as valve seat support portions that support the valve seat 5 towards the downstream side and extend towards the downstream side. The right and left projecting portions 11a are arranged symmetrically with respect to the center of the tube of the inlet circulation flow passage 11. The right and left projecting portions 11a are arranged so as to be parallel to the rotating axis of the rotating shaft part 21.

The projecting portions 11a are in contact with the surface of the annular rib 55 (the sleeve 50) on the rear end side. Thus, the projecting portions 11a support the valve seat 5 towards the downstream side, and prevent the valve seat 5 from being pushed to the upstream side. Here, spaces are formed above and below each of the projecting portions 11a relatively to each other between the surface of the annular rib 55 on the upstream side and a surface of the inlet circulation flow passage 11 on the downstream side. As the spaces are formed, an upstream part of the sleeve 50 (the valve seat 5) is able to swing in the upper-lower direction while using the projecting portions 11a as fulcrums. As a result, when the valve element 2 is in the valve closed state, even when the valve element 2 is somewhat displaced in the rotating direction, the sleeve 50 is able to swing in the upper-lower direction and come into close contact with the valve element 2. Thus, it is possible to ensure that the inlet flow passage 81 is sealed.

The seal ring 51 seals a gap between the sleeve 50 and the inlet flow passage 81 while permitting the sleeve 50 to swing to the front and the rear. Thus, a leakage of a fluid from the inlet flow passage 81 is prevented when the valve element 2 is closed.

As shown in FIG. 2 and FIG. 3, the lock mechanism 4 is a device that prevents or permits opening of the valve element 2. The lock mechanism 4 includes a lock pin 40, a cylinder valve 41, and a pin energizing part 45. The lock pin 40 is able to protrude to and retract from the rotation region of the valve element 2. The cylinder valve 41 is connected with a lower end of the lock pin 40. The pin energizing part 45 energizes the cylinder valve 41 in a direction in which the lock pin 40 is retracted. A part of the lock pin 40, the cylinder valve 41, and the pin energizing part 45 are housed in a storing chamber S formed inside the body 8. The lock mechanism 4 allows the lock pin 40 to protrude into the rotation region of the valve element 2, thereby hindering the valve element 2 from opening. Also the lock mechanism 4 allows the lock pin 40 to retract from the rotation region of the valve element 2, thereby permitting the valve element 2 to open.

Hereinafter, a state in which the lock mechanism 4 allows the lock pin 40 to protrude into the rotation region of the valve element 2 and hinders the valve element 2 from opening is referred to as a locked state. Meanwhile, a state where the lock mechanism 4 makes the lock pin 40 retract from the rotation region of the valve element 2 and permits the valve element 2 to open is referred to as an unlocked state.

As shown in FIG. 3, the storing chamber S is divided into a first cylinder chamber S1 and a second cylinder chamber S2 by the cylinder valve 41. The first cylinder chamber S1 applies energizing force to the cylinder valve 41 so as to make the lock pin 40 protrude. The second cylinder chamber S2 applies energizing force to the cylinder valve 41 so that the lock pin 40 is retracted. Most of an inside of the storing chamber S is filled with the coolant. Inner volumes of the first cylinder chamber S1 and the second cylinder chamber S2 change as the cylinder valve 41 moves inside the storing chamber S. A relation between the first cylinder chamber S1 and the second cylinder chamber S2 is such that a volume of one of the first cylinder chamber S1 and the second cylinder chamber S2 becomes large, a volume of the other becomes small.

The first cylinder chamber S1 includes a first flow passage 46, a labyrinth chamber S3, a pin insertion hole 48, and an opening portion 42. The first flow passage 46 is a communication passage that allows the first cylinder chamber S1 to communicate with the inlet flow passage 81 and the inlet circulation flow passage 11. The labyrinth chamber S3 communicates directly with the first flow passage 46 and has a labyrinth structure inside. The pin insertion hole 48 and the opening portion 42 penetrate into the tube of the outlet flow passage 82 from an inside of the first cylinder chamber S1. The first flow passage 46 is connected with the inlet circulation flow passage 11 at a position where the inlet flow passage 81 and the inlet circulation flow passage 11 overlap each other in their radial directions. The pin insertion hole 48 is arranged in a lower tube wall of the outlet flow passage 82 near the downstream side of the valve element 2.

As shown in FIG. 2 and so on, the first flow passage 46 has a first orifice 46a having an orifice shape in which a diameter of a tube serving as a flow passage is at least partially reduced. The first flow passage 46 includes a circular opening 46b on the tube wall of the inlet circulation flow passage 11 and the opening 46b communicates with an inside of the tube of the inlet circulation flow passage 11. FIG. 2 shows that, in the first flow passage 46, the entire tube serving as the flow passage has the orifice shape, and the first flow passage 46 is the first orifice 46a. A tube diameter of the first orifice 46a is smaller than an opening diameter of the opening 46b. The tube diameter of the first orifice 46a and the opening diameter of the opening 46b are smaller than a tube diameter of the inlet flow passage 81.

The coolant inside the first cylinder chamber S1 enters and exits between the inside of the first cylinder chamber S1 and the inlet flow passage 81 or the inlet circulation flow passage 11 through the first flow passage 46. A direction and speed of the coolant entering and exiting through the first flow passage 46 are determined in accordance with the differential pressure before and after the valve. This will be described later. Further, the speed of the coolant entering and exiting through first flow passage 46 is determined by the tube diameter and a tube length of the first orifice 46a.

The labyrinth chamber S3 is provided with at least one baffle plate 86, and a flow passage of a labyrinth seal structure is constructed. As the coolant flowing from the first flow passage 46 passes the flow passage of the labyrinth seal structure, solid foreign matters such as dusts contained in the coolant are trapped by the labyrinth seal structure. It is thus possible to avoid entry of foreign matters into a space between the cylinder valve 41 and an inner wall surface of the storing chamber S, thereby maintaining smooth sliding of the cylinder valve 41.

The second cylinder chamber S2 includes a second flow passage 47 that allows the second cylinder chamber S2 and the outlet flow passage 82 to communicate with each other. The coolant inside the second cylinder chamber S2 enters and exits between the inside of the second cylinder chamber S2 and the outlet flow passage 82 through the second flow passage 47.

The second flow passage 47 has a second orifice 47a having an orifice shape in which a part of a tube diameter is reduced. The second flow passage 47 includes an opening (hereinafter, referred to as an opening of the second flow passage 47) that communicates with the outlet flow passage 82. The opening of the second flow passage 47 is provided at a position on the downstream side of the valve element 2 at the valve closing time and also on the upstream side of the valve element 2 at the valve opening time.

The center of the opening of the second flow passage 47 is arranged on the rear side of the center of the opening of the pin insertion hole 48 or the opening portion 42. The front side of the opening of the second flow passage 47 may overlap the rear side of the opening of the pin insertion hole 48 or the opening portion 42. In other words, at least a part of the opening of the second flow passage 47 is arranged on the upstream side of the pin insertion hole 48.

In this embodiment, the opening of the second flow passage 47 is arranged on the rear side with respect to the valve element 2. Further, the opening of the second flow passage 47 is arranged on the rear side of the openings of the pin insertion hole 48 and the opening portion 42.

A direction and speed of the coolant entering and exiting through the second flow passage 47 are determined in accordance with the differential pressure before and after the valve. This will be described later. Further, the speed of the coolant entering and exiting the second flow passage 47 is determined by a tube diameter or a tube length of the second orifice 47a.

A direction of energizing force from the coolant energized towards the cylinder valve 41 is determined by a balance between pressure of the coolant inside the first cylinder chamber S1 and pressure of the coolant inside the second cylinder chamber S2. Hereinafter, differential pressure obtained by subtracting the pressure of the coolant inside the second cylinder chamber S2 from the pressure of the coolant inside the first cylinder chamber S1 is referred to as differential pressure before and after the cylinder.

The pin insertion hole 48 and the opening portion 42 are arranged in the lower tube wall of the outlet flow passage 82 near the downstream side of the valve element 2. The opening portion 42 is a hole with a diameter larger than that of the pin insertion hole 48. The axis of the pin insertion hole 48 and an axis of the opening portion 42 overlap each other (not shown). The opening portion 42 is arranged on the outlet flow passage 82 side with respect to the pin insertion hole 48, and one end of opening portion 42 is open on the outlet flow passage 82. The pin insertion hole 48 is a through-hole formed linearly with a circular section. The pin insertion hole 48 is the through-hole that reaches the second cylinder chamber S2 from an opening on the other end of the opening portion 42.

Figure 8:
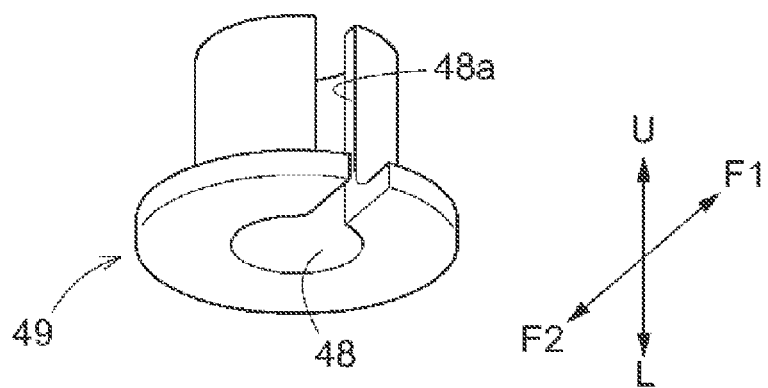
FIG. 8 is a view describing a pin support, a pin insertion hole, and a groove.

In the pin insertion hole 48, a groove 48a (see FIG. 8) is formed in a hole wall surface on the upstream side (a side of reference numeral U) inside the pin insertion hole 48. The groove 48a continues between the opening portion 42 that communicates with the outlet flow passage 82, and the first cylinder chamber S1. The groove 48a extends along the extending direction of the pin insertion hole 48 and is depressed from the hole wall surface towards an outer side in a radial direction of the pin insertion hole 48. A space formed by the groove 48a allows the first cylinder chamber S1 and the outlet flow passage 82 to communicate with each other. As the groove 48a is formed, foreign matters such as dusts entering the pin insertion hole 48 are discharged to the downstream through the depression of the groove 48a.

In this embodiment, a pin support 49 (see FIG. 8) is mounted on a mounting hole provided in an upper wall of the first cylinder chamber S1. The pin support 49 has a cylindrical part and an inside of the cylindrical part serves as the pin insertion hole 48. In the pin support 49, a part of the cylindrical part is cut out linearly in a longitudinal direction of the cylinder. Thus, the groove 48a is formed in the pin support 49.

The pin support 49 is formed with use of a material that achieves both friction resistance and low friction. For example, a material like PPS and carbon, and a structure in which bronze is coated with PTFE are used. Thus, durability and so on of the pin insertion hole 48 can be improved while the body 8 is formed with use of inexpensive engineering plastics.

As shown in FIG. 3, the lock pin 40 is a bar-shaped member having a circular section. The cylinder valve 41 is fixed to a lower end of the lock pin 40. The cylinder valve 41 is formed into a bottomed cylinder shape. Then, the lock pin 40 extends upwardly from an inner surface of a cylinder bottom of the bottomed cylinder of the cylinder valve 41. A distal end side (an upper end side) of the lock pin 40 is inserted into the pin insertion hole 48.

The lock pin 40 is able to slide inside the pin insertion hole 48. The distal end of the lock pin 40 protrudes into and retracts from the pin insertion hole 48 as the cylinder valve 41 slides in the upper-lower direction inside the storing chamber S as described later. The lock pin 40 hinders the valve element 2 from opening as the lock pin 40 moves (protrudes) to a locked position (a position denoted by reference numeral 40b in FIG. 3) where the lock pin 40 protrudes into the rotation region of the valve element 2 and at least partially overlaps the rotation region of the valve body. The lock pin 40 allows the valve element 2 to open as the lock pin 40 moves (retracts) to an unlocked position (a position denoted by reference numeral 40a in FIG. 3) where the lock pin 40 retracts from the rotation region of the valve element 2.

An protruding-retracting distance X of the lock pin 40 from the unlocked position to a position where the lock pin 40 overlaps the rotation region of the valve body (the shortest distance between the unlocked position and the locked position) is longer than a minimum distance Y between the distal end portion of the lock pin 40 on the upstream side at the locked position with respect to the flow direction of the coolant, and the distal end of the sleeve 50. Further, the protruding-retracting distance is longer than the shortest rotating distance of the valve element 2. The shortest rotating distance of the valve element 2 is the shortest distance of the rotation locus from the position where the valve element 2 is in contact with the valve seat 5 (the position at the valve closing time) through the position where the valve body 20 of the valve element 2 overlaps the lock pin 40 in the upper-lower direction due to rotation of the valve element 2. Hereinafter, the end portion of the valve body 20 on the opposite side from the rotating shaft part 21 is simply referred to as a distal end of the valve body 20.

The cylinder valve 41 divides the storing chamber S into the first cylinder chamber S1 on the upper side and the second cylinder chamber S2 on the lower side. An O-ring-shaped seal member is fitted into an outer part of the cylinder of the cylinder valve 41 and seals the first cylinder chamber S1 and the second cylinder chamber S2 on the lower side. The outer part of the cylinder valve 41 is able to come into sliding contact with an inner wall of the storing chamber S that extends along the upper-lower direction, and the cylinder valve 41 is able to slide inside the storing chamber S in the upper-lower direction. The cylinder valve 41 is able to move in the upper-lower direction inside the storing chamber S in accordance with a balance between the differential pressure before and after the cylinder, and the energizing force of the pin energizing part 45 described later.

The pin energizing part 45 has an elastic member such as a coil spring, and energizes the cylinder valve 41 downwardly (to the direction away from the outlet flow passage 82). The pin energizing part 45 according to this embodiment is a coil spring. The lock pin 40 is inserted to an inner side of the coil spring of the pin energizing part 45. The pin energizing part 45 is sandwiched between the cylinder valve 41 and the upper wall of the first cylinder chamber S1 in a state where the lock pin 40 is inserted in the inner side of the coil spring. Thus, the pin energizing part 45 energizes the lock pin 40 downwardly through cylinder valve 41 while using the upper wall of the first cylinder chamber S1 as a fulcrum. Therefore, the pin energizing part 45 energizes the lock pin 40 in the direction in which the lock pin 40 retracts into the pin insertion hole 48.

When the differential pressure before and after the valve (that is the differential pressure before and after the cylinder) is equal to or larger than second pressure, the energizing force of the pin energizing part 45 is set to energizing force that allows the coolant to flow into the first cylinder chamber S1 and also allows the coolant to flow out from the second cylinder chamber S2 so that the cylinder valve 41 moves upwardly (to the side towards the outlet flow passage 82). In other words, when the differential pressure before and after the valve is smaller than the second pressure, the energizing force of the pin energizing part 45 allows the coolant to flow out from first cylinder chamber S1 and also allows the coolant to flow into the second cylinder chamber S2 so that the cylinder valve 41 moves downwardly. A value of the second pressure is larger than zero and smaller than the first pressure. This means that the lock pin 40 protrudes when the differential pressure before and after the valve is the second pressure and larger, and that the lock pin 40 retracts when the differential pressure before and after the valve is smaller than the second pressure. In this embodiment, speed of the coolant flowing into or out of the first cylinder chamber S1 and the second cylinder chamber S2 is adjustable with a mechanical structure such as tube diameters and tube lengths of the first orifice 46a and the second orifice 47a.

Figure 9:
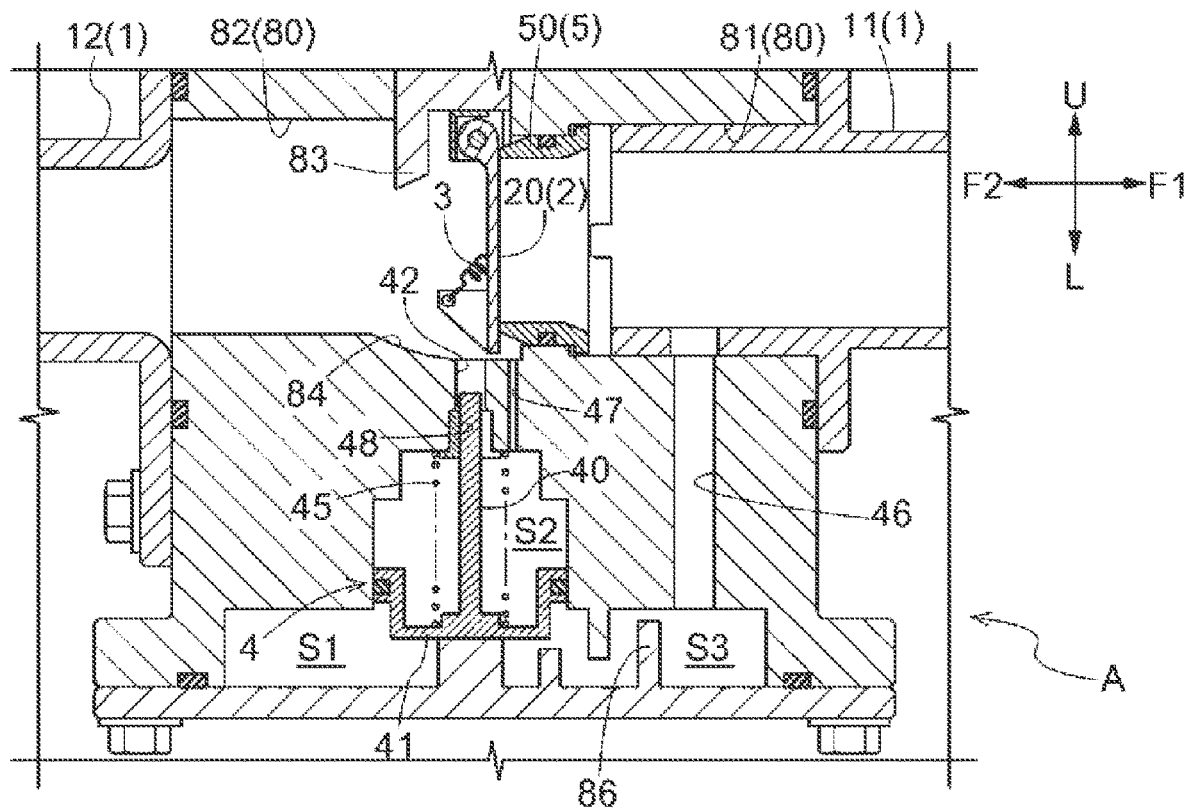
FIG. 9 is a view showing a state of the valve device in a first state.

FIG. 9 shows a state of the valve device A when the differential pressure before and after the valve is smaller than the second pressure. This state is referred to as a first state. The valve element 2 is energized by the energizing part 3 and in close contact with the entire circumference of the distal end of the sleeve 50. The valve body 20 of the valve element 2 does not overlap the lock pin 40 in the upper-lower direction.

In the first state, the valve element 2 seals the inlet flow passage 81 as the valve element 2 comes into close contact with the entire circumference of the distal end of the sleeve 50. At this time, the valve seat 5 receives pressure of the coolant inside the inlet flow passage 81 (the differential pressure before and after the valve) and is thus pressed against the valve element 2. The lock pin 40 is energized by the pin energizing part 45 and retracts into (housed inside) the pin insertion hole 48 and the opening portion 42. Therefore, the lock mechanism 4 is in the unlocked state.

In the first state, the pin insertion hole 48 is positioned on the front side and the downstream side with respect to the valve element 2. The opening of the second flow passage 47 is positioned on the rear side and the downstream side with respect to the valve element 2.

Second State

Figure 10:
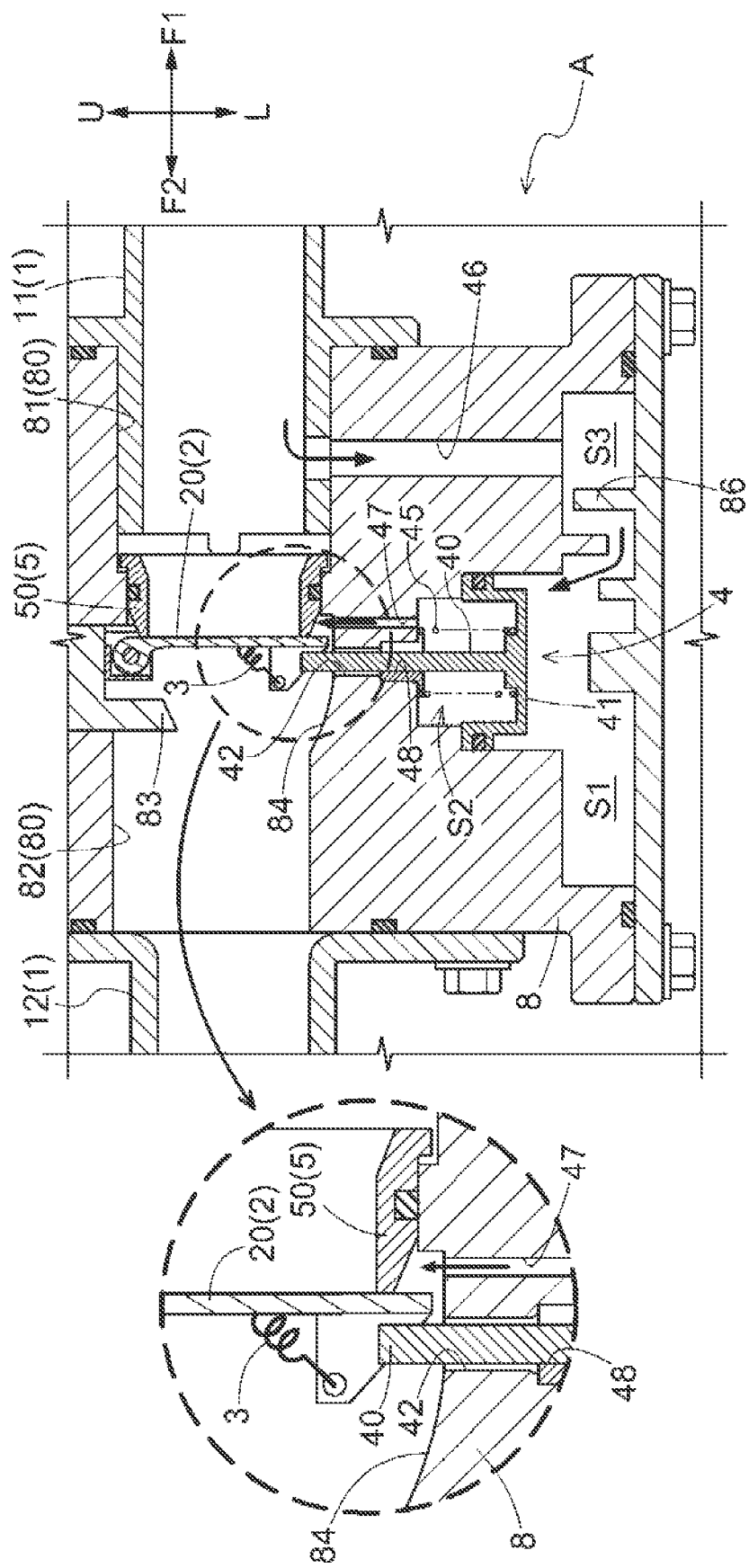
FIG. 10 is a view showing a state of the valve device in a second state.

FIG. 10 shows a state of the valve device A when the differential pressure before and after the valve is smaller than the first pressure and equal to or larger than the second pressure. Hereinafter, this state is referred to as a second state.

The states of the valve element 2 and the valve seat 5, as well as the positional relation between the valve element 2, and the pin insertion hole 48 and the opening of the second flow passage 47 are the same as those in the first state. The differential pressure before and after the cylinder is almost equal to the differential pressure before and after the valve unless pressure losses in the first flow passage 46 and the second flow passage 47 are taken into consideration, and a positive-negative relation is the same for the differential pressures. This means that differential pressure before and after the cylinder in the second state is smaller than the first pressure, and also equal to or larger than the second pressure.

In the second state, the coolant flows into the first cylinder chamber S1 and the coolant flows out from the second cylinder chamber S2. Thus, the cylinder valve 41 and the lock pin 40 move upwardly. In the second state, due to the differential pressure before after the valve, the lock pin 40 protrudes from the pin insertion hole 48 and enters the rotation region. Therefore, the lock mechanism 4 is in the locked state. In this embodiment, the pin insertion hole 48 and the lock pin 40 are arranged so that a side surface of the lock pin 40 on the upstream side comes into contact with a side surface of the valve element 2 on the downstream side in the state where the lock pin 40 enters the rotation region. In some cases, the valve element 2 may swing to some extent to the front and to the rear in the rotating direction due to an error of installing the lock pin 40 in the protruding state. However, in this embodiment, because the valve seat 5 moves (swings) in the upper-lower direction and the front-rear direction in response to swinging of the valve element 2, the inlet flow passage 81 is kept sealed.

Figure 12:
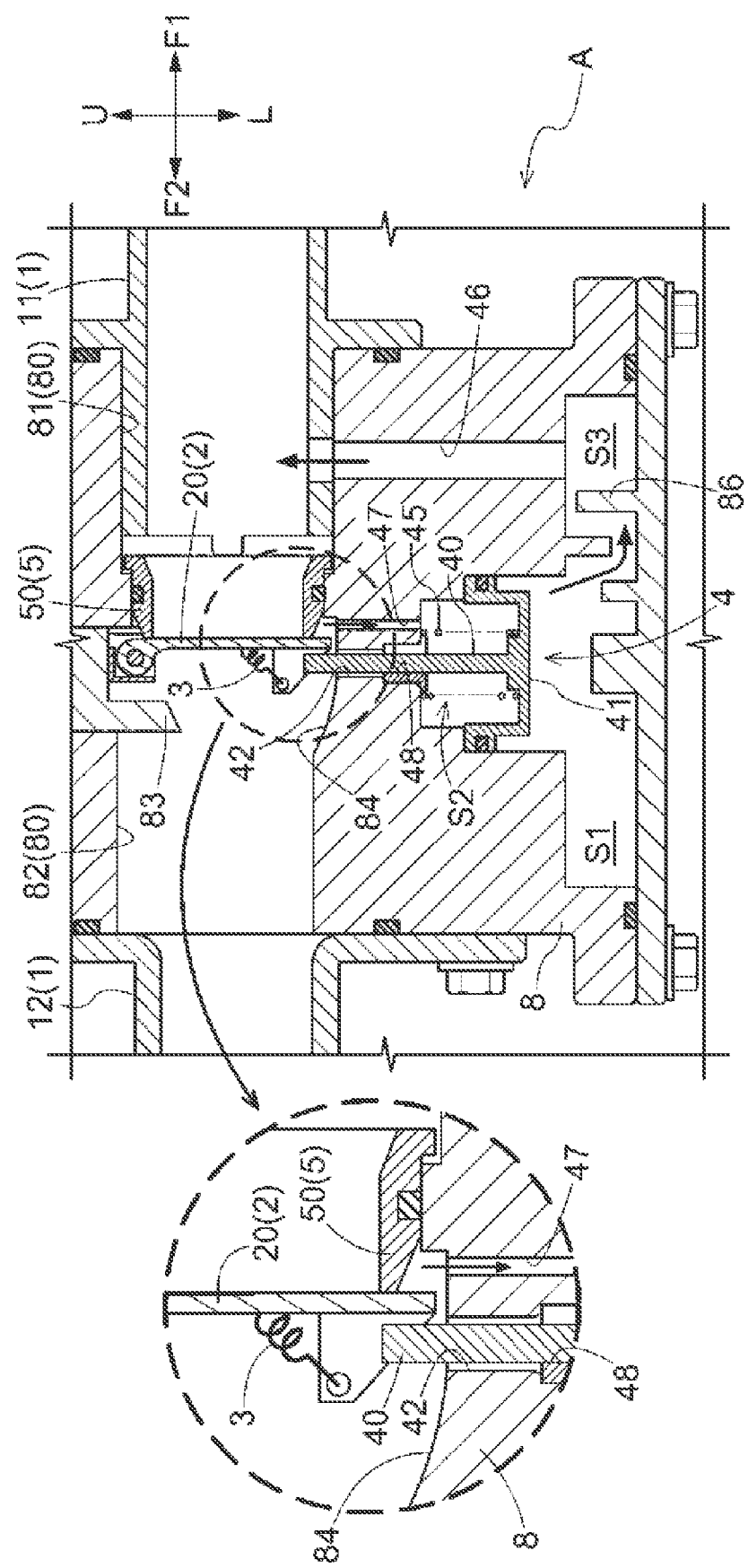
FIG. 12 is a view showing a state of the valve device when the valve device is changed from the second state to the first state.

The control device 9 adjusts an output of the pump part P (see FIG. 1) so that the differential pressure before and after the valve is increased (from a value lower than the second pressure to a value equal to or larger than the second pressure and smaller than the first pressure). Thus, a state transition happens from the first state to the second state. The control device 9 adjusts an output of the pump part P so that the differential pressure before and after the valve is decreased (from a value equal to or larger than the second pressure and smaller than the first pressure to a value smaller than the second pressure). Thus, a state transition happens from the second state to the first state (see FIG. 12).

Figure 11:
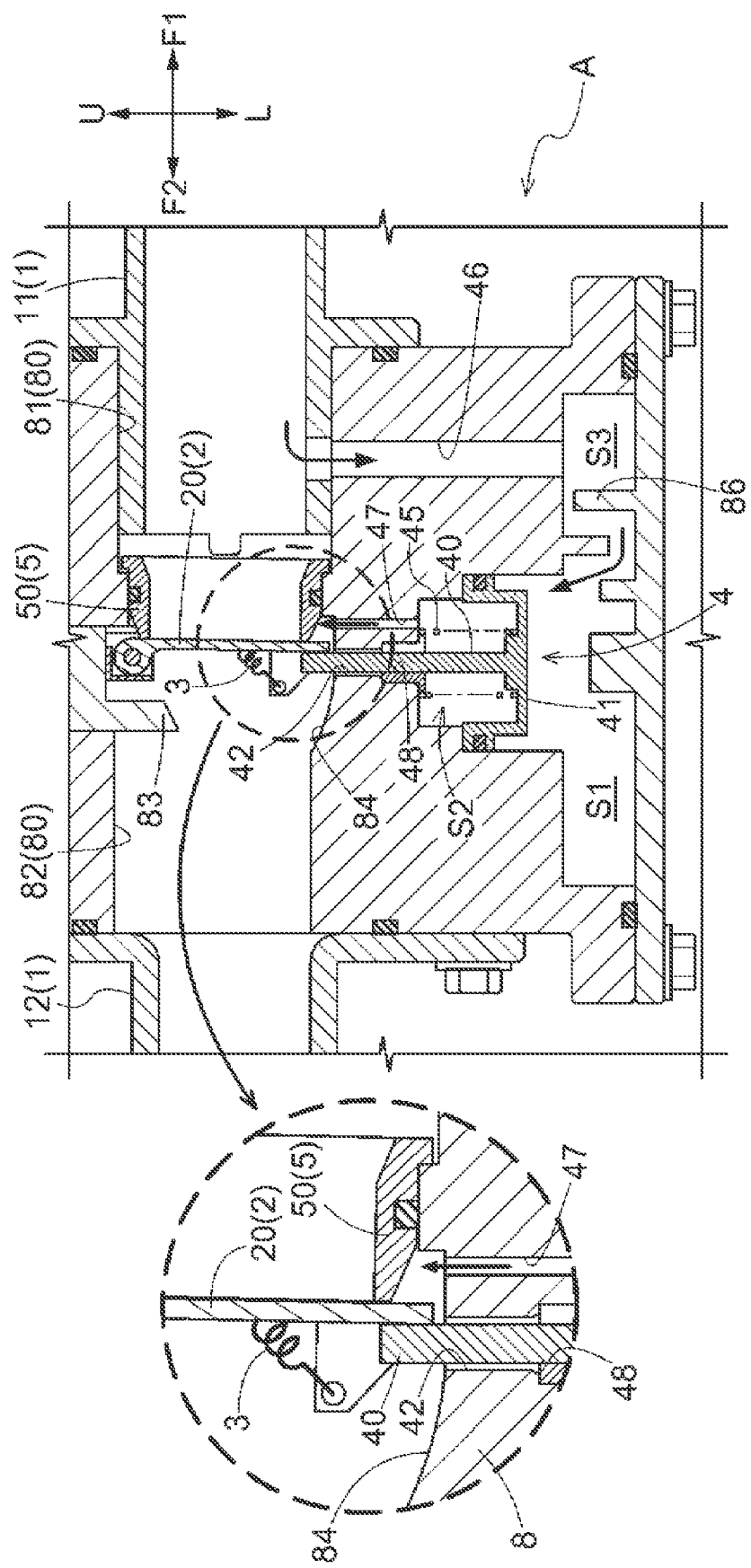
FIG. 11 is a view showing a state of the valve device in a third state.

The control device 9 adjusts an output of the pump part P (see FIG. 1) so that the differential pressure before and after the valve increases even further from the second state (from a value equal to or larger than the second pressure and smaller than the first pressure to a value equal to or larger than the first pressure). In this case, the state is changed to a third state shown in FIG. 11. The differential pressure before and after the cylinder in the third state is equal to or larger than the first pressure.

In the third state, a state of the valve seat 5 and the lock pin 40, and the positional relation between the valve element 2 and the opening of the pin insertion hole 48 and the second flow passage 47 are the same as those in the second state. However, the state of the valve element 2 is different. In the third state, although the valve element 2 tries to move away from the valve seat 5 and rotate in the valve opening direction due to the differential pressure before and after the valve, the valve element 2 is in contact with the lock pin 40 and is thus closed. Therefore, the valve element 2 in the third state is in the state where the valve element 2 rotates slightly more to the valve opening direction than the valve element 2 in the first state and the second state. However, in this embodiment, as the valve element 2 opens slightly (a state where the valve element 2 rotates in the valve opening direction until the valve element 2 comes into contact with the lock pin 40), the valve seat 5 moves in the upper-lower direction and the front-rear direction accordingly, and follows the state of the valve element 2. Thus, the inlet flow passage 81 is kept sealed.

As the control device 9 adjusts an output of the pump part P so that the differential pressure before and after the valve is reduced (from a value equal to or larger than the first pressure to a value equal to or larger than the second pressure and smaller than the first pressure), state transition happens from the third state to the second state.

Hereinafter, the position of the valve element 2 in the first state, the second state, and the third state (the position where the valve body 20 of the valve element 2 does not overlap the lock pin 40 in the upper-lower direction) is referred to as a first valve position. That first valve position is a position that falls within a range from the state where the valve element 2 is in close contact with the entire circumference of the distal end of the sleeve 50 (the first state and the second state) to the state where the valve element 2 is in contact with the lock pin 40 although the valve element 2 is slightly distanced from the distal end of the sleeve 50 (the third state). When the valve element 2 is in the first valve position, the valve is closed. When the valve element 2 is in the first valve position, since the lock mechanism 4 is in the locked state, the lock mechanism 4 is able to hinder the valve element 2 from opening. The valve closed state in this embodiment happens when the valve element 2 is in the first valve position.

Further, the position of the valve element 2 at which the valve element 2 is opened more than the first valve position and the valve body 20 of the valve element 2 overlaps the lock pin 40 in the upper-lower direction is referred to as a second valve position. When the valve element 2 is at the first valve position, the differential pressure before and after the valve becomes smaller than the second pressure, and the lock mechanism 4 is in the unlocked state. As the differential pressure before and after the valve is increased thereafter so as to be equal to or larger than the first pressure, the valve element 2 is opened and permitted to move to the second valve position. When the valve element 2 is at the second valve position, the valve element 2 is distanced from the valve seat 5, and the valve is thus in the valve opened state. When the valve element 2 is at the second valve position, it is impossible to hinder the valve element 2 from opening further even when the lock mechanism 4 is in the locked state.

Fourth State

Figure 13:
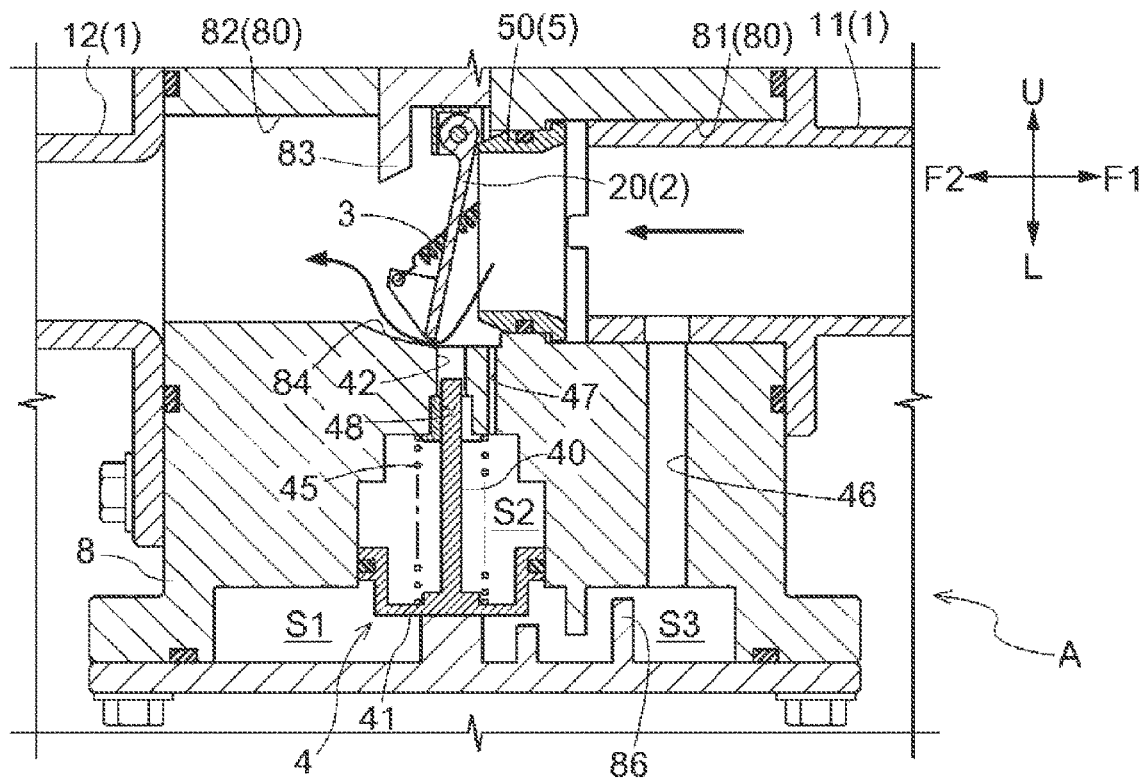
FIG. 13 is a view showing a state of the valve device in a fourth state (when the valve body is adjacent to an adjacent wall portion)
Figure 14:
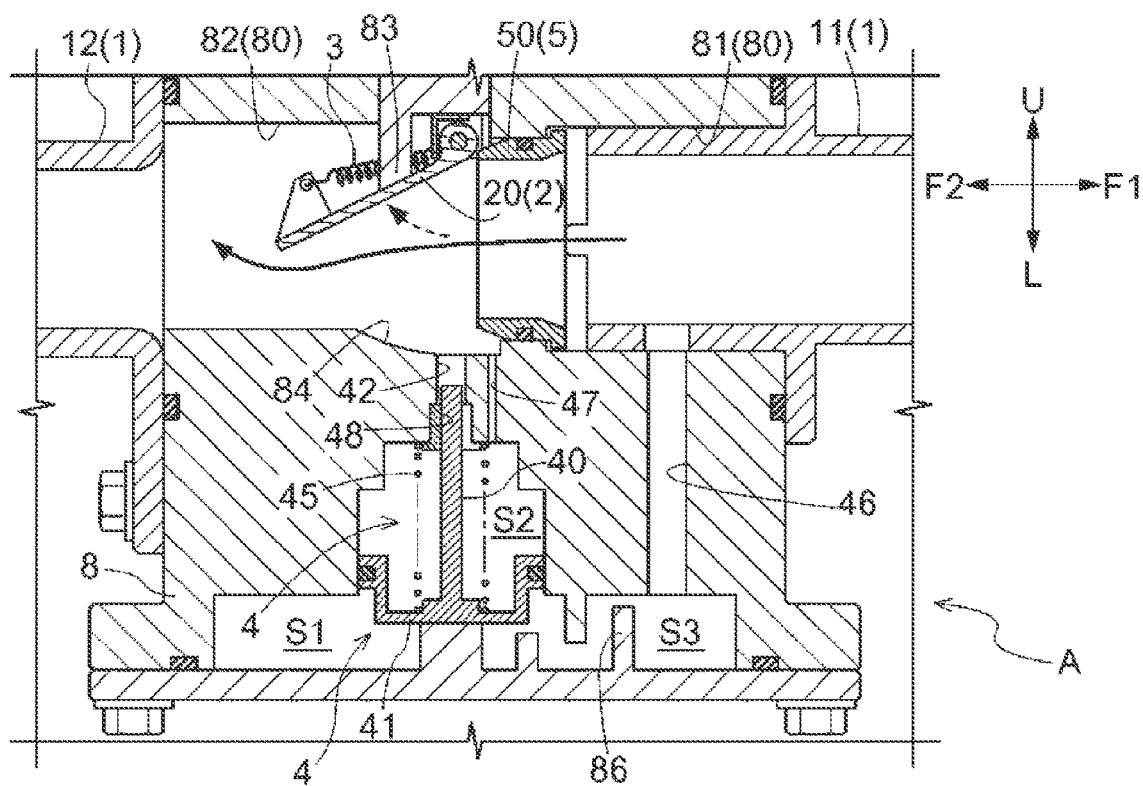
FIG. 14 is a view showing a state of the valve device in the fourth state (when the valve body is separated from the adjacent wall portion)

FIG. 13 and FIG. 14 show states of the valve device A when the differential pressure before and after the valve is equal to or larger than the first pressure. Hereinafter, states shown in FIG. 13 and FIG. 14 and also a state in which the valve element 2 is positioned at an arbitrary position between the states shown in FIG. 13 and FIG. 14 are referred to as a fourth state. The position of the valve element 2 in the case of the fourth state is at the second valve position. FIG. 13 shows a position at which the valve element 2 is opened in a state where the valve element 2 has just passed the opening portion 42 and is adjacent to the adjacent wall portion 84 (an adjacent second valve position). FIG. 14 shows a position at which the valve element 2 is opened widely as the valve element 2 is distanced from the adjacent wall portion 84 (a distanced second valve position).

In the fourth state, the valve element 2 opens the valve due to differential pressure before and after the valve, and such state is maintained. In the fourth state, the pin insertion hole 48 is positioned on the rear side and the upstream side with respect to the valve element 2. The opening of the second flow passage 47 is positioned on the rear side and the upstream side with respect to the valve element 2.

In the fourth state, normally, the differential pressure before and after the cylinder becomes smaller than the second pressure. Since both the first flow passage 46 and the second flow passage 47 are positioned on the upstream side with respect to the valve element 2, the differential pressure before and after the cylinder is almost zero unless a pressure loss in the flow passage 80 on the upstream side of the valve element 2 and pressure losses in the first flow passage 46 and the second flow passage 47 are taken into consideration. Therefore, the lock pin 40 is energized by the pin energizing part 45 and thus retracts into (is housed inside) the pin insertion hole 48, and the lock mechanism 4 is in the unlocked state.

In the fourth state, the lock mechanism 4 is permitted to change from the unlocked state to the locked state. For example, transition of the lock mechanism 4 from the unlocked state to the locked state can happen when the differential pressure before and after the cylinder becomes equal to or larger than the second pressure and smaller than the first pressure as a result of an increase in a pressure loss in the flow passage 80 on the upstream side of the valve element 2 as flow speed of the coolant flowing in the flow passage 80 increases excessively for some reasons (for example, a breakdown). However, in this case, there is no problem as the valve element 2 is positioned at the second valve position and is not affected by the lock mechanism 4.

The state changes to the fourth state when the control device 9 adjusts an output of the pump part P so that the differential pressure before and after the valve is increased from the first state in a short period of time (a value smaller than the second pressure and also smaller than the first pressure). Here, the short period of time means a time period that is necessary for transition from the first state to the fourth state (hereinafter, referred to as valve opening transition time), and is shorter than a time period that is necessary for transition from the first state to the second state (hereinafter, referred to as lock transition time) when the differential pressure before and after the valve is increased from a value smaller than the second pressure to a value equal to or larger than the first pressure. This means that, in the first state, speed at which the differential pressure before and after the valve increases from a value smaller than the second pressure to a value equal to or larger than the first pressure is defined as speed at which the valve element 2 rotates in the valve opening direction beyond the pin insertion hole 48 before the lock pin 40 protrudes from the unlocked position, moves to the locked position, and overlaps the rotation region due to the increase in the differential pressure.

In this embodiment, speed of the coolant flowing into and out from the first cylinder chamber S1 and the second cylinder chamber S2 is adjusted so as to be lowered through an adjustments such as a reduction and an increase of the tube diameters of the first orifice 46a and the second orifice 47a (see FIG. 2). Thus, the lock transition time necessary for transition of the lock mechanism 4 from the unlocked state to the locked state is adjusted so that the lock transition time becomes longer. Further, the control device 9 adjusts an output of the pump part P (see FIG. 1) so that speed at which the differential pressure before and after the valve increases from a value smaller than the second pressure to a value equal to or larger than the first pressure is made higher than given speed. Thus, control is performed so that valve opening transition time necessary for the valve element 2 to complete movement from the first valve position to the second valve position becomes shorter than the lock transition time. Hence, transition of the valve element 2 from the first state to the fourth state becomes possible.

Further, in this embodiment, as the control device 9 adjusts an output of the pump part P, and so on, when the valve element 2 is opened, rotation speed of the valve element 2 at which the valve element 2 moves from the first valve position to the second valve position is set to be higher than unlocking speed at which the lock pin 40 moves from the unlocked position to the locked position. This ensures that the valve element 2 moves from the first valve position to the second valve position and also enables transition of the valve device A from the first state to the fourth state.

The control device 9 adjusts an output of the pump part P and the differential pressure before and after the valve is lowered (from a value equal to or larger than the first pressure to a value smaller than the first pressure and equal to or larger than the second pressure). Thus, state transition occurs from the fourth state to the second state. At the time of this state transition, the lock pin 40 does not ascend to a position that overlaps the rotation region until at least the valve element 2 completes movement from the second valve position to the first valve position. Since the opening of the second flow passage 47 is arranged on the upstream side of the pin insertion hole 48, the relation in which both the first flow passage 46 and the second flow passage 47 are positioned on the upstream side with respect to the valve element 2 is maintained until the valve element 2 passes above the pin insertion hole 48, and the differential pressure before and after the cylinder is maintained at almost zero. This means that, when the state transition happens from the fourth state to the second state, the lock mechanism 4 does not change from the unlocked state to the locked state at least before the valve element 2 completes its movement from the second valve position to the first valve position. In this embodiment, when an operation is carried out in order to move the valve element 2 from the second valve position to the first valve position, it is preferred that the differential pressure before and after the valve is reduced at once from a value equal to or larger than the first pressure to a value smaller than the second pressure so that the state of the valve element 2 is changed from the fourth state to the first state.

This means that, when the control device 9 causes the valve element 2 to move from the second valve position to the first valve position (when the valve is closed), the control device 9 controls the pump part P and adjusts the differential pressure before and after the valve so that the lock mechanism 4 becomes the locked state after the valve element 2 moves to first valve position.

As described so far, it is possible to provide a flow passage device that is able to operate with a simple structure and at given coolant temperature, and also an engine cooling system in which the flow passage device is used.

In the foregoing embodiment, the case is described in which the pin support 49 is mounted on the mounting hole provided in the upper wall of the first cylinder chamber S1. The pin support 49 includes the cylindrical part, and an inside of the cylindrical part serves as the pin insertion hole 48. However, the pin insertion hole 48 may be formed in the upper wall of first cylinder chamber S1.

In the foregoing embodiment, the case is described in which the second flow passage 47 that allows the second cylinder chamber S2 and the outlet flow passage 82 to communicate with each other, and the groove 48a that allows the first cylinder chamber S1 and the outlet flow passage 82 to communicate with each other are formed separately from each other. However, only one of the second flow passage 47 and the groove 48a may be formed. Similarly to the second flow passage 47, the groove 48a allows the second cylinder chamber S2 and the outlet flow passage 82 to communicate with each other. Therefore, when the second flow passage 47 is not provided, and only the groove 48a is provided, the groove 48a is substituted for the function of the second flow passage 47 described in the foregoing embodiment. Thus, the coolant is allowed to enter and exit from the inside of the second cylinder chamber S2 and the inside of the outlet flow passage 82 through the groove 48a instead of the second flow passage 47.

Figure 15:
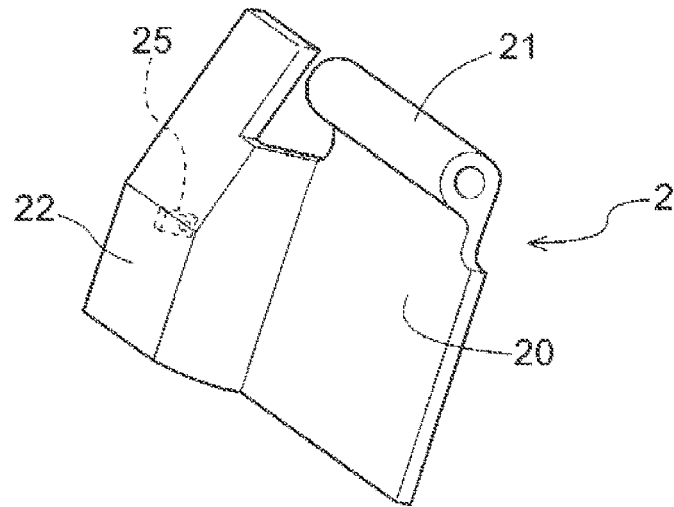
FIG. 15 is a perspective view of a valve body in another form.
Figure 16:
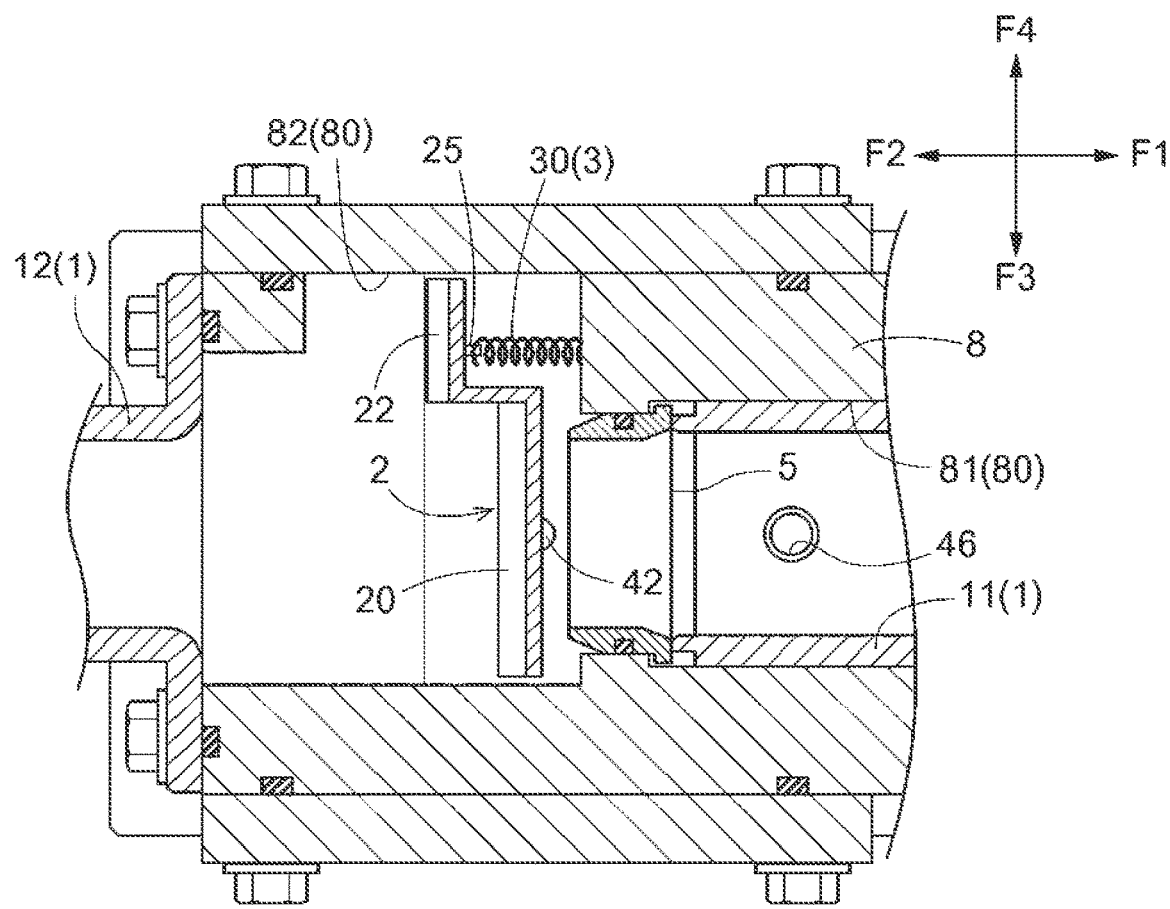
FIG. 16 is a horizontal sectional view of a valve device in which the valve body in another form is used.
Figure 17:
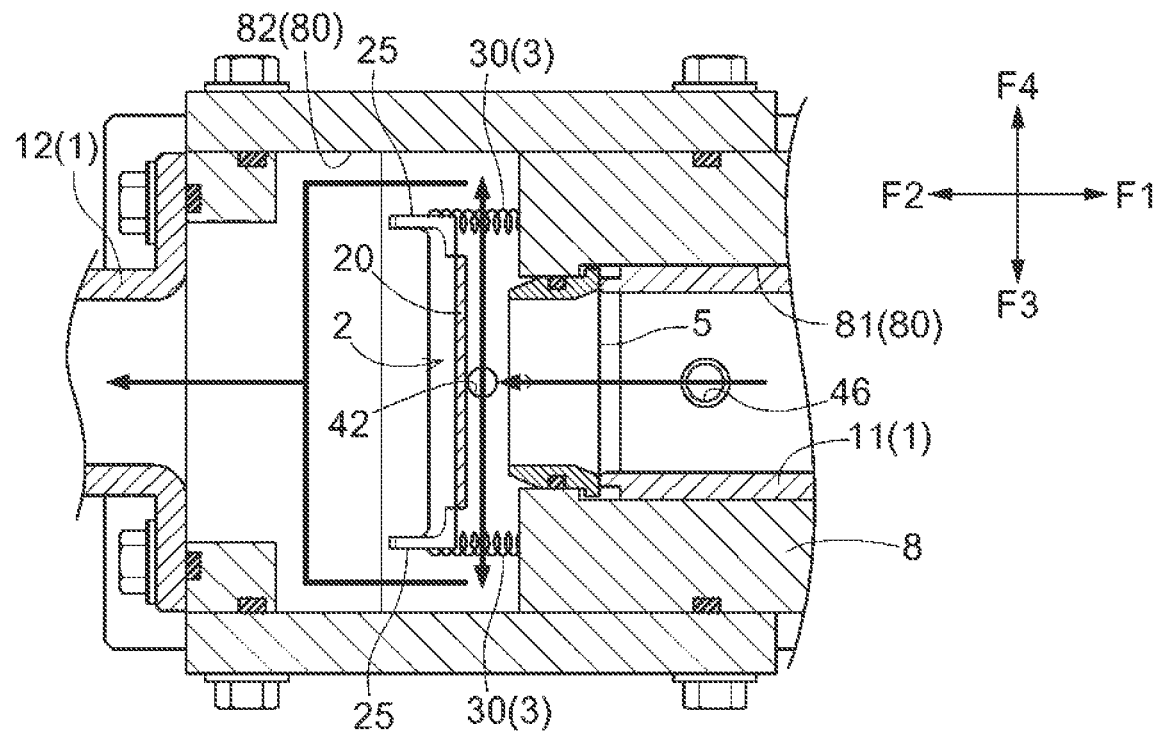
FIG. 17 is a view describing a flow of coolant inside the valve device according to an embodiment.
Figure 18:
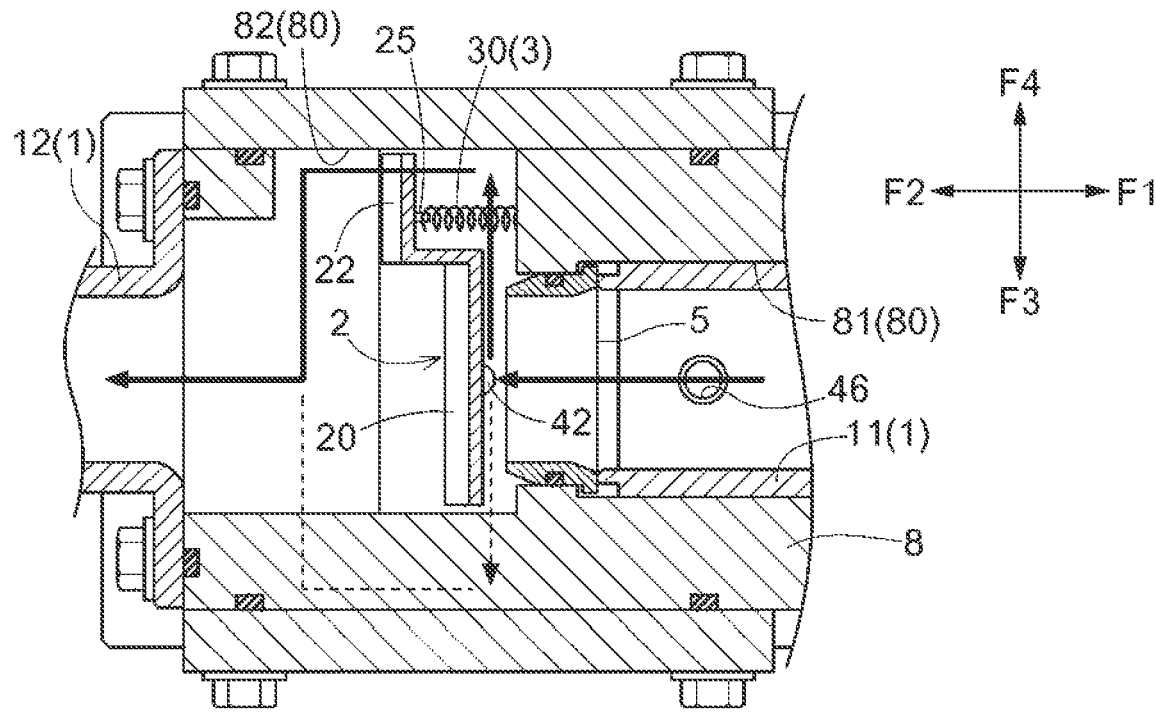
FIG. 18 is a view describing a flow of the coolant inside the valve device in which a valve body according to yet another form is used.

In the foregoing embodiment, the case is described in which the valve element 2 includes the valve body 20, the rotating shaft part 21 provided in the valve body 20, and the connecting parts 25 connected with the elastic members, respectively. The connecting parts 25 are provided on both side portions of the valve element 2 in the rotating direction, respectively, as a pair. However, as shown in FIG. 15, the valve element 2 may have one connecting part 25 on one of the side portions of the valve element 2 in the rotating direction. For example, the valve element 2 may include a valve body 20, a rotating shaft part 21 provided in the valve body 20, a connecting plate part 22, and a single connecting part 25. The connecting plate part 22 is raised to the front from one side surface of the valve body 20. The connecting part 25 is provided on a back surface of the connecting plate part 22 and is connected with an elastic member 30 as shown in FIG. 16. Like the valve element 2 described in the foregoing embodiment, when the connecting parts 25 are provided on both side parts of the valve body 20 in the rotating direction, respectively, as a pair, space is required for arranging the elastic members 30 on both side portions of the valve element 2 as shown in FIG. 17. This causes an increase in a flow amount of the coolant even when the opening of the valve element 2 is small. However, when the connecting part 25 is provided in only one of the side parts of the valve element 2, it is sufficient to form a space for arranging the elastic member 30 only on the one side part of the valve element 2 as shown in FIG. 18. Therefore, it is possible to reduce a flow amount of the coolant when the opening of the valve element 2 is small. Thus, it is possible to easily adjust a flow amount of the coolant through an adjustment of the opening of the valve element 2.

Figure 19:
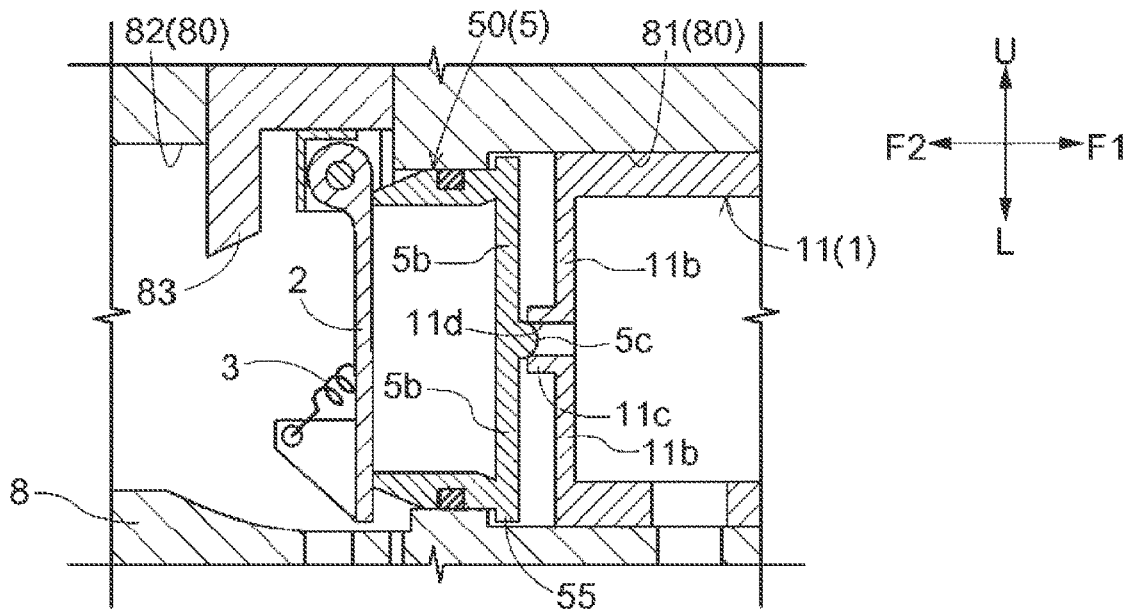
FIG. 19 is a vertical sectional view of a valve device in another form.

In the foregoing embodiment, the case is described in which the right and left projecting portions 11a are provided as valve seat support portions in the distal end portion of the inlet circulation flow passage 11, the projecting portions 11a extending towards the downstream side. The surface of the annular rib 55 on the upstream side is brought into contact with the projecting portions 11a, and the upstream part of the sleeve 50 (the valve seat 5) is thus able to swing in the upper-lower direction with use of the projecting portions 11a as fulcrums. Therefore, the valve seat 5 swings in the upper-lower direction and is thus able to come into close contact with the valve element 2. However, instead of providing the right and left projecting portions 11a in the distal end portion of the inlet circulation flow passage 11, as shown in FIG. 19, a support portion 11c may be provided as a valve seat support portion on an inner side (for example, a center in a radial direction) of the inlet circulation flow passage 11, and a supported portion 5c is provided on an inner side (for example, a center in a radial direction) of the sleeve 50. As the support portion 11c supports the supported portion 5c at one point, the upstream part of the sleeve 50 (the valve seat 5) is able to swing in the upper-lower direction. Thus, the valve seat 5 is able to swing in the upper-lower direction, and is thus able to come into close contact with the valve element 2.

Figure 20:
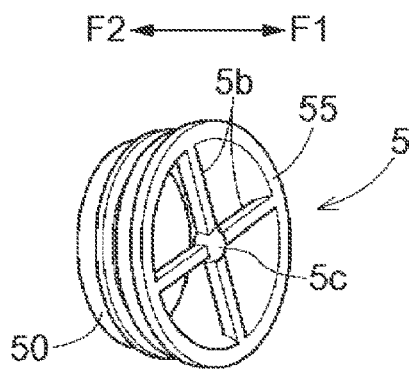
FIG. 20 is a perspective view of a distal end portion of an inlet circulation flow passage in another form.

FIG. 20 shows a case in which the support portion 11c is formed such that the support portion 11c includes a pair of bridging parts 11b and a depressed part 11d. The bridging parts 11b are provided in the distal end portion of the inlet circulation flow passage 11, and the depressed part 11d faces the front. The bridging parts 11b are provided in a radial direction across the tube wall and cross each other. The depressed part 11d is provided in a part where the bridging parts 11b cross each other. The part where the bridging part 11b cross each other, and the depressed part 11d are positioned in the center of the inlet circulation flow passage 11 in the radial direction.

Figure 21:
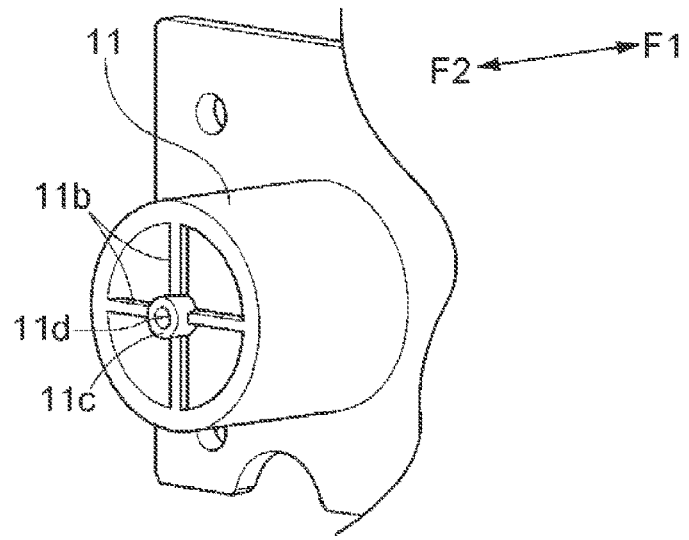
FIG. 21 is a perspective view of a valve seat in another form.

FIG. 21 shows a case where a pair of bridging parts 5b is provided in a rear end portion of the valve seat 5, and a projecting part facing the rear is formed as the supported portion 5c. The bridging parts 5b extend across the sleeve 50 in a radial direction and cross each other. The projecting part is formed in a part where the bridging parts 5b cross each other. The part where the bridging parts 5b cross each other, and the supported portion 5c are positioned in the center of the sleeve 50 in the radial direction. FIG. 19 depicts a case where the supported portion 5c that is the projecting part is brought into contact with the depressed part 11d, and is thus supported by the support portion 11c. Therefore, the upstream part of the valve seat 5 is able to swing in the upper-lower direction and the right-left direction, and is thus able to come into close contact with the valve element 2.

Further, the right and left projecting portions 11a may be provided as the valve seat support portions. In addition, the support portion 11c may also be provided as the valve seat support portion on the inner side of the inlet circulation flow passage 11, and the supported portion 5c may be provided on the inner side of the sleeve 50. Thus, the right and left projecting portions 11a and the support portion 11c are able to support the upstream part of the sleeve 50 so that the upstream part of the sleeve 50 is able to swing in the upper-lower direction.

Figure 22:
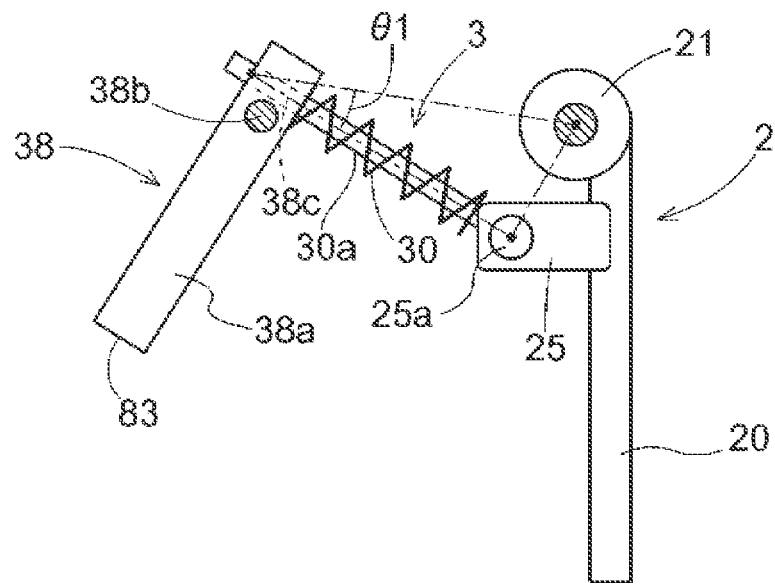
FIG. 22 is a view describing configurations of a valve body and an energizing part in another form (when the valve is closed)
Figure 23:
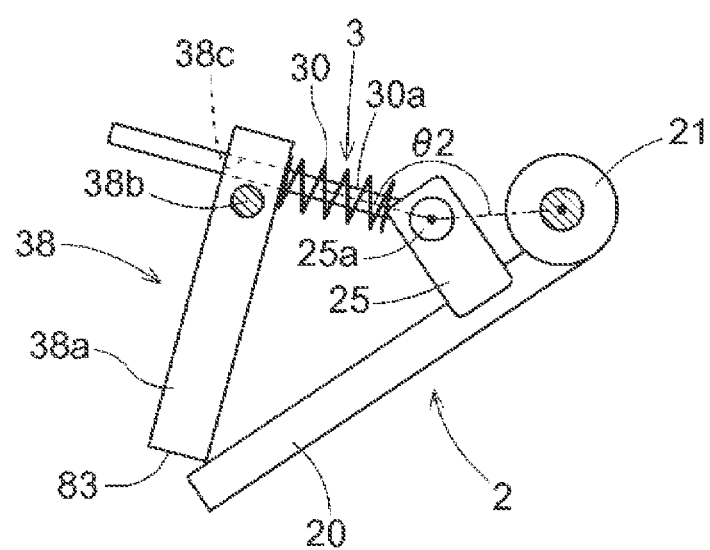
FIG. 23 is a view describing configurations of the valve body and the energizing part in another form (when the valve is open)

In the foregoing embodiment, the case is described in which the pivotally connecting parts 38 are arranged on the rear side of the connecting parts 25, respectively, in the extending direction of the flow passage 80, and each of the elastic members 30 is a tension spring-type coil spring. Due to contracting force of the coil spring, the valve element 2 is energized towards the inlet flow passage 81. However, as shown in FIG. 22 and FIG. 23, there are instances where each of the pivotally connecting parts 38 is arranged on the front side (the downstream side) of the connecting parts 25, respectively, and the elastic members 30 energize the valve element 2 towards the inlet flow passage 81 with expanding force of the coil spring. FIG. 22 shows states of the valve element 2 and the energizing part 3 at the valve closing time, and FIG. 23 shows states of the valve element 2 and the energizing part 3 at the valve opening time.

In the case shown in FIG. 22 and FIG. 23, the energizing part 3 includes the elastic member 30 that is a push spring-type coil spring or the like, a link bar 30a inserted into the coil spring of the elastic member 30, and the pivotally connecting part 38 that pivotally connects the elastic member 30 and the link bar 30a with the body 8 on the front side of the connecting part 25. This pivotally connecting part 38 has a link hole 38c into which the link bar 30a is inserted in a sliding manner, and rotates using the rotating shaft 38b as a rotating axis. The rotating shaft 38b is parallel to the rotating shaft part 21. The link hole 38c is arranged on the upper side and the rear side of the rotating shaft part 21. The link hole 38c is arranged on the upper side and the rear side of the rotating shaft 38b, and the link bar 30a inserted into the link hole 38c in the sliding manner is arranged so as to extend in a direction crossing the rotating shaft 38b. The link bar 30a and the connecting part 25 are connected with each other so that a distal end of the link bar 30a is able to rotate through a pin or the like inserted into the connecting hole 25a. The elastic member 30 energizes the valve element 2 towards the inlet flow passage 81 in the state where the elastic member 30 is supported by the link bar 30a. When the valve element 2 opens, the elastic member 30 contracts, and the pivotally connecting part 38 slides in a direction in which the link bar 30a proceeds into the link hole 38c while the pivotally connecting part 38 rotates using the rotating shaft 38b as the rotating axis. The opposite happens when the valve element 2 closes. As shown in FIG. 22 and FIG. 23, a lower side end part of the pivotally connecting part 38 may serve as the locking part 83.

As shown in FIG. 22, at the valve closing time, the rotating shaft part 21, the connecting part 25, and the pivotally connecting part 38 (the link hole 38c) are arranged so that an angle θ1 formed by the rotating shaft part 21, the connecting part 25, and the pivotally connecting part 38 becomes 90 degrees or smaller in the valve closed state. The angle θ1 is formed at the pivotally connecting part 38 (a position of the axis of the link hole 38c farthest from the connecting hole 25a) as a vertex. In this case, with regard to valve closing torque acting from the elastic member 30 to the valve element 2, torque at the valve closing time becomes the greatest, and torque at the valve opening time can be smaller than that at the valve closing time.

The rotating shaft part 21, the connecting part 25, and the pivotally connecting part 38 (the link hole 38c) are arranged so as to form an obtuse triangle in which the connecting part 25 is the vertex with an obtuse angle at the maximum valve opening time of the valve element 2. Thus, valve closing torque at the maximum valve opening time can become smaller than that of the valve closing time or the valve opening time (except the maximum valve opening time).

As the pivotally connecting part 38 is arranged on the front side (the downstream side) of the connecting part 25 as described above, it is possible to improve a degree of freedom in selecting a structure and a mechanism of the energizing part 3, such as employing a push spring-type coil spring as the elastic member 30, as well as a degree of freedom in a layout for arranging the energizing part 3.

Figure 24:
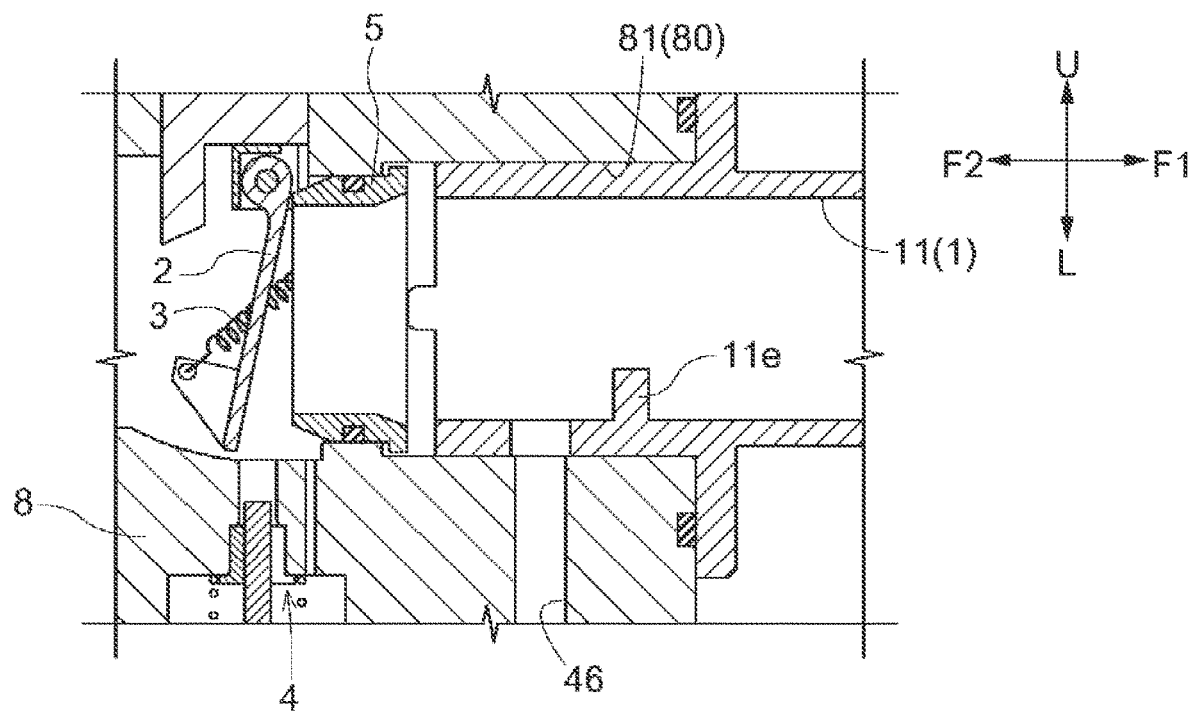
FIG. 24 is a view describing a raised part.

In the foregoing embodiment, the case is described in which the first cylinder chamber S1 has the first flow passage 46 that is a communication passage that allows the first cylinder chamber S1 to communicate with the inlet flow passage 81 and the inlet circulation flow passage 11. The first flow passage 46 has the circular opening 46b that is formed in the tube wall of the inlet circulation flow passage 11 and communicates with the inside of the inlet circulation flow passage 11. In this case, as shown in FIG. 24, a raised part 11e (for example, a plate having a surface that crosses the flow direction of the coolant) may be provided in the tube wall of the inlet circulation flow passage 11 adjacent to the upstream side of the opening of the first flow passage 46 of the inlet circulation flow passage 11. The raised part 11e is raised to the inner side of the inlet circulation flow passage 11. The raised part 11e may be provided at a position away from a rear end portion of the opening 46b by a distance that is twice as long as a diameter of the opening 46b, or at a position closer to the rear end portion of the opening 46b than that. A height of the raised part 11e (a length of the raised part 11e extending from the tube wall to the inside of the tube) may be a height that is 0.5 to 2.0 times of the diameter of the opening 46b.

As this kind of raised part 11e is provided, a vortex flow is generated near the opening 46b on the downstream side of the raised part 11e, thereby reducing pressure of the coolant applied to the inside of the first cylinder chamber S1 from the first flow passage 46. Thus, when there is transition from the first state to the second state, it is possible to make adjustment so that the differential pressure before and after the cylinder is reduced, and speed at which the coolant flows into the first cylinder chamber S1 is reduced. This means that it is possible to extend the lock transition time of the lock mechanism 4 when the valve element 2 is open from the first valve position to the second valve position. This ensures that the valve element 2 opens.

In the foregoing embodiment, the case is described in that the sleeve 50 includes the end surface 55a on the rear side of the sleeve 50, and the inclined surface 50a formed on the inner side of the rear side end portion of the sleeve 50. The end surface 55a and the inclined surface 50a function as the pressure receiver that receives pressure of the coolant inside the inlet flow passage 81. However, the sleeve 50 does not need to have the inclined surface 50a.

In the foregoing embodiment, the case is described in which the position of the valve body 20 of the valve element 2 that does not overlap the lock pin 40 in the upper-lower direction is the first valve position, and it is possible to hinder the valve element 2 from opening when the lock mechanism 4 is brought into the locked state. Further, the position of the valve element 2 at which the valve element 2 is open more than the first valve position, and the valve body 20 of the valve element 2 overlaps the lock pin 40 in the upper-lower direction is the second valve position. Thus, even when the lock mechanism 4 is in the locked state, it is impossible to hinder the valve element 2 from opening further. It is described that the protruding-retracting distance X is longer than the minimum distance Y between the distal end portion of the sleeve 50 and the distal end portion of the lock pin 40 at the locked position on the upstream side in the flow direction of the coolant.

Figure 25:
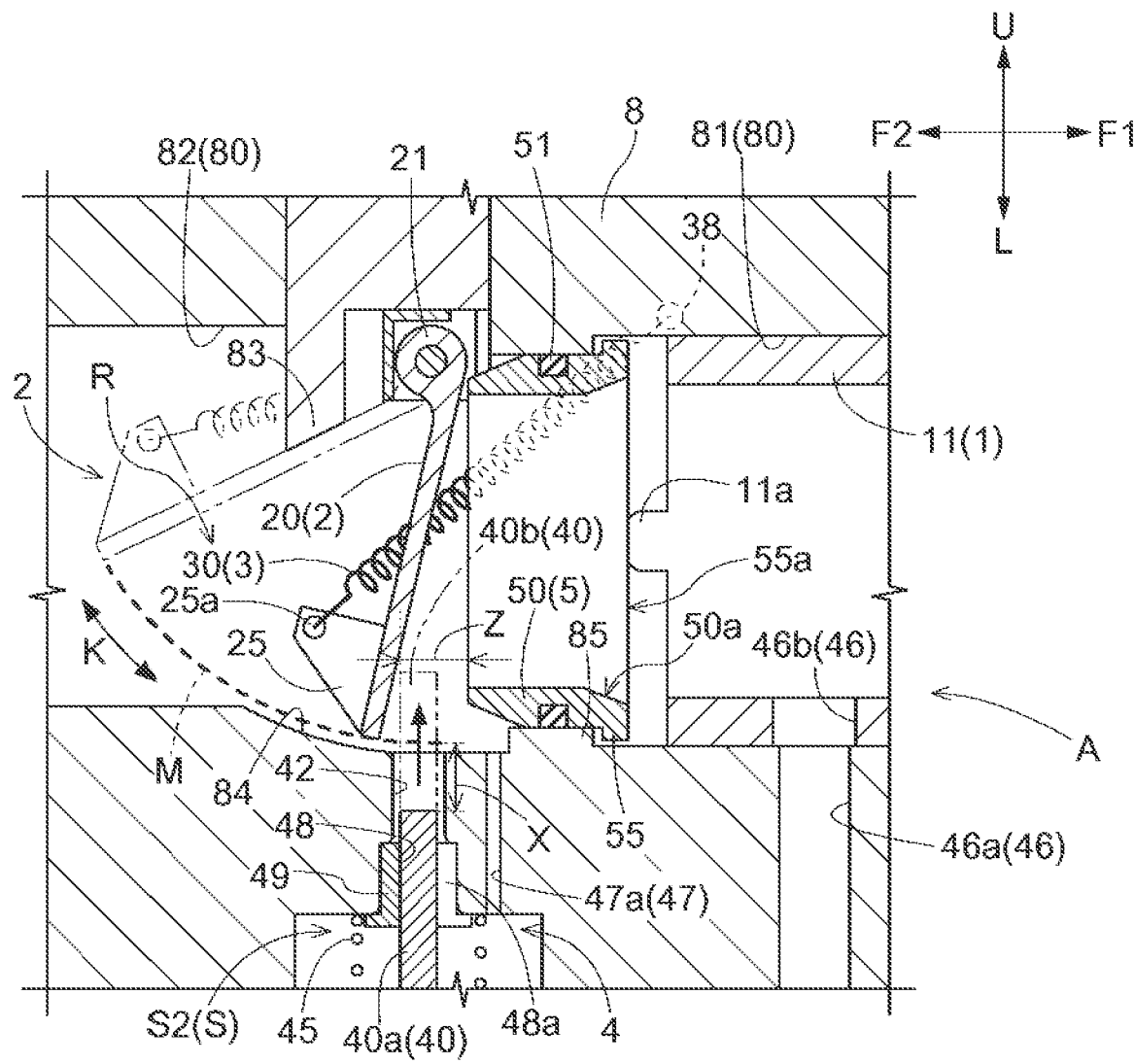
FIG. 25 is a view describing another configuration of the first valve position and the second valve position.

However, as shown in FIG. 25, there are instances where the first valve position of the valve element 2 is a position at which the valve element 2 is distanced from the valve seat 5 from the valve closed state in which the valve element 2 is in contact with the valve seat 5, until the end of the valve body 20 of the valve element 2 opposite from the rotating shaft part 21 overlaps the lock pin 40 in the upper-lower direction. Thus, it may be possible to hinder the valve element 2 from opening as the lock mechanism 4 falls into the locked state. In this case, the second valve position of the valve element 2 becomes a position at which the valve element 2 opens from the valve closed position beyond the position where the valve element 2 overlaps the lock pin 40 in the upper-lower direction, and the valve body 20 of the valve element 2 (except the end of the valve body 20 opposite from the rotating shaft part 21) overlaps the lock pin 40 in the upper-lower direction. Thus, even when the lock mechanism 4 is in the locked state, it is impossible to hinder the valve element 2 from opening further. The protruding-retracting distance X is longer than a minimum distance Z between the distal end portion of the sleeve 50 and the distal end portion of the lock pin 40 at the locked position on the downstream side in the flow direction of the coolant.

There is an example of the case where the first valve position of the valve element 2 is the position at which the valve element 2 is distanced from the valve seat 5 from the valve closed state in which the valve element 2 is in contact with the valve seat 5, until the end of the valve body 20 of the valve element 2 opposite from the rotating shaft part 21 overlaps the lock pin 40 in the upper-lower direction. In this example, when the lock pin 40 comes into contact with the end of the valve body 20 opposite from the rotating shaft part 21, and the lock pin 40 energizes the valve body 20 towards the rotating shaft part 21, frictional resistance of the rotating shaft part 21 increases and rotation of the valve element 2 may be hindered. In particular, when a positional relation among the lock pin 40, the valve body 20, and the rotating shaft part 21 is such that the lock pin 40, the end of the valve body 20 opposite from the rotating shaft part 21, and the rotating shaft part 21 are arrayed linearly when the lock pin 40 vertically comes into contact with the end surface of the end of the valve body 20 opposite from the rotating shaft part 21, frictional resistance of the rotating shaft part 21 increases, and rotation of the valve element 2 is hindered. Therefore, there are cases where the valve element 2 is hindered from opening when the lock mechanism 4 is in the locked state.

Moreover, when an inclined surface is formed in the end surface of the end of the valve body 20 opposite from the rotating shaft part 21, the incline surface facing the front and bottom, the first valve position becomes a position at which the valve element 2 is distanced from the valve seat 5 from the valve closed state in which the valve element 2 is in contact with the valve seat 5, until a position at which the end of the valve body 20 of the valve element 2 opposite from the rotating shaft part 21 overlaps the lock pin 40 in the upper-lower direction. When the lock pin 40 comes into contact with the end surface of the end of the valve body 20 opposite from the rotating shaft part 21, and the lock pin 40 energizes the valve body 20 towards the rotating shaft part 21, the distal end of the lock pin 40 slips on the inclined surface and ascends, thereby pushing the valve body 20 back to the rear side. Therefore, it is possible to hinder the valve element 2 from opening as the lock mechanism 4 falls into the locked state.

The configuration disclosed in the foregoing embodiment (including other embodiments, and the same is applied below) may be combined with configurations disclosed in other embodiments for application unless inconsistency occurs. Also, the embodiments disclosed in this specification are examples only, and embodiments of the disclosure are not limited to them, and may be changed as appropriate without departing from the object of the disclosure.

The disclosure is applicable to a flow passage device that is able to operate with arbitrary coolant temperature, and to an engine cooling system in which the flow passage device is used.

In the flow passage device, the lock mechanism may include a first cylinder chamber, a second cylinder chamber, a pin energizing part, a first flow passage, and a second flow passage. The first cylinder chamber may be configured so that the lock pin is protruded by pressure of the fluid on the upstream side of the swing valve. The second cylinder chamber may be configured so that the lock pin is retracted by pressure of the fluid on the downstream side of the swing valve. The pin energizing part may be configured so as to energize the lock pin in a retracting direction. The first flow passage allows the first cylinder chamber to communicate with the circulation flow passage on the upstream side of the swing valve. The second flow passage allows the second cylinder chamber to communicate with the circulation flow passage on the downstream side of the swing valve.

With the foregoing configuration, the lock mechanism is able to allow the lock pin to protrude and retract freely in accordance with a balance between the pin energizing part, and pressure of the coolant in the first cylinder chamber and pressure of the coolant in the second cylinder chamber. In this case, it is possible to adjust pressure of the coolant in the first cylinder chamber with use of pressure in the flow passage on the upstream side of the swing valve. Pressure of the coolant in the second cylinder chamber can be adjusted by pressure in the flow passage on the downstream side of the swing valve.

In the flow passage device, the lock pin may be inserted into a pin insertion hole that penetrates from an outside of the circulation flow passage to an inner side of the circulation flow passage, and the lock pin may be provided so as to be able to protrude into and retract from the rotation region through the pin insertion hole. At least a part of an opening of the second flow passage into the circulation flow passage may be arranged on an upstream side of the pin insertion hole.

With the foregoing configuration, the opening of the second flow passage is arranged on the upstream side of the pin insertion hole. Therefore, when the swing valve is open from the second valve position to the first valve position, a positional relation is maintained such that both the first flow passage and the second flow passage are positioned on the upstream side with respect to the swing valve at least until the swing valve passes above the pin insertion hole, and differential pressure of the fluid between the first flow passage and the second flow passage, in other words, the differential pressure between the first cylinder chamber and the second cylinder chamber is maintained almost zero. Hence, when the swing valve closes from the second valve position to the first valve position, it is possible to maintain the lock mechanism in the unlocked state.

In the above flow passage device, a raised part may be provided in a tube wall of the circulation flow passage. The tube wall may be adjacent to the opening of the first flow passage provided in the circulation flow passage on an upstream side. The raised part may be raised from the tube wall to an inner side of the flow passage.

With the above configuration, a vortex flow is generated on the downstream side of the raised part near the opening of the first flow passage, and it is thus possible to reduce pressure of the coolant applied to the first cylinder chamber from the first flow passage. Because of this, when the swing valve is opened from the first valve position to the second valve position, differential pressure of the fluid between the first flow passage and the second flow passage, in other words, differential pressure between the first cylinder chamber and the second cylinder chamber is reduced. Thus, it is possible to prevent the lock mechanism from changing to the locked state.

The foregoing flow passage device may further include a pump and a control device. The pump is configured so as to generate the fluid differential pressure, and the control device is configured so as to control opening and closing of the swing valve. The control device may be configured so as to adjust the fluid differential pressure by controlling the pump such that the lock mechanism is brought into the locked state after the swing valve moves to the first valve position when the swing valve is closed.

With the foregoing configuration, as the control device controls the pump so as to adjust the fluid differential pressure between the upstream of the swing valve and the downstream of the swing valve, the control device is able to open and close the swing valve freely. Further, the lock mechanism is able to allow the swing valve to open or prevent the swing valve from opening.

With the above configuration, especially when the swing valve is closed, the lock mechanism is changed to the locked state after the swing valve moves from the second valve position to the first valve position. Thus, it is possible to prevent the lock pin from hindering closing of the swing valve. Thus, closing of the swing valve is ensured.

In the above flow passage device, the circulation flow passage may include an adjacent wall portion extending along the rotation region.

With the above configuration, when the swing valve in a valve open state is located at the position along the adjacent wall portion, it is possible to increase the differential pressure between the upstream of the swing valve and the downstream of the swing valve. Thus, it is possible to increase variation of the opening of the swing valve with respect to a flow amount of the fluid. As a result, it becomes easier to adjust the opening of the swing valve and a flow amount of the fluid passing the swing valve.

What is claimed is:

1. A flow passage device configured to form part of an engine cooling system that cools an engine, the flow passage device comprising: a circulation flow passage in which a fluid is allowed to circulate between the engine and a radiator; a swing valve provided in the circulation flow passage, the swing valve being configured so as to open due to fluid differential pressure between upstream of the swing valve and downstream of the swing valve, and to open and rotate to a downstream side; an energizing part configured to energize the swing valve to a valve closing direction against the fluid differential pressure between the upstream of the swing valve and the downstream of the swing valve in the circulation flow passage; and a lock mechanism including a lock pin, the lock pin being configured so as to protrude into a rotation region of the swing valve and hinder the swing valve from opening, the lock pin being configured so as to retract from the rotation region of the swing valve such that the swing valve is allowed to open, wherein the swing valve is configured so as to rotate from a first valve position to a second valve position, the first valve position being a position at which the lock mechanism is able to hinder the swing valve from opening, and the second valve position being a position at which the swing valve is open more than the first valve position and the lock mechanism is not able to hinder the swing valve from opening, the lock mechanism is configured so as to set a locked state and set an unlocked state, the locked state being a state in which the lock pin is protruded to a locked position at which the lock pin overlaps the rotation region, and the unlocked state being a state in which the lock pin is retracted to an unlocked position at which the lock pin does not overlap the rotation region, and the lock pin is configured so as to protrude as being energized by pressure of the fluid on an upstream side of the swing valve, and to retract as being energized by pressure of the fluid on the downstream side of the swing valve.

2. The flow passage device according to claim 1, wherein:
the lock mechanism includes a first cylinder chamber, a second cylinder chamber, a pin energizing part, a first flow passage, and a second flow passage;
the first cylinder chamber is configured so that the lock pin is protruded by pressure of the fluid on the upstream side of the swing valve;
the second cylinder chamber is configured so that the lock pin is retracted by pressure of the fluid on the downstream side of the swing valve;
the pin energizing part is configured so as to energize the lock pin in a retracting direction;
the first flow passage allows the first cylinder chamber to communicate with the circulation flow passage on the upstream side of the swing valve; and
the second flow passage allows the second cylinder chamber to communicate with the circulation flow passage on the downstream side of the swing valve.

3. The flow passage device according to claim 2, wherein:
the lock pin is inserted into a pin insertion hole that penetrates from an outside of the circulation flow passage to an inner side of the circulation flow passage, the lock pin being provided so as to be able to protrude into and retract from the rotation region through the pin insertion hole; and
at least a part of an opening of the second flow passage into the circulation flow passage is arranged on an upstream side of the pin insertion hole.

4. The flow passage device according to claim 2, wherein a raised part is provided in a tube wall of the circulation flow passage, the tube wall being adjacent to the opening of the first flow passage provided in the circulation flow passage on an upstream side, the raised part being raised from the tube wall to an inner side of the circulation flow passage.

5. The flow passage device according to claim 1, further comprising:
a pump configured so as to generate fluid differential pressure; and
a control device configured so as to control opening and closing of the swing valve, wherein the control device is configured so as to adjust the fluid differential pressure by controlling the pump such that the lock mechanism is brought into the locked state after the swing valve moves to the first valve position when the swing valve is closed.

6. The flow passage device according to claim 1, wherein the circulation flow passage includes an adjacent wall portion along the rotation region.

7. An engine cooling system comprising:
a circulation flow passage in which a fluid is allowed to circulate between an engine and a radiator by a pump;
a bypass flow passage connected with the circulation flow passage, the bypass flow passage bypassing the radiator;
a swing valve provided between the radiator and the bypass flow passage in the circulation flow passage, the swing valve being configured so as to open due to fluid differential pressure between upstream of the swing valve and downstream of the swing valve, and rotate and open to a downstream side;
an energizing part configured to energize the swing valve in a valve closing direction against the fluid differential pressure between the upstream of the swing valve and the downstream of the swing valve in the circulation flow passage; and
a lock mechanism including a lock pin, is the lock pin being configured so as to protrude into a rotation region of the swing valve and thus hinder the swing valve from opening, the lock pin being configured so as to retract from the rotation region of the swing valve such that the swing valve is allowed to open, wherein
the swing valve is configured so as to rotate from a first valve position to a second valve position, the first valve position being a position at which the lock mechanism is able to hinder the swing valve from opening, the second valve position being a position at which the swing valve is open more than the first valve position and the lock mechanism is not able to hinder the swing valve from opening;
the lock mechanism is configured so as to set a locked state and to set an unlocked state, the locked state being a state in which the lock pin is protruded to a locked position at which the lock pin overlaps the rotation region, and the unlocked state being a state in which the lock pin is retracted to an unlocked position at which the lock pin does not overlap the rotation region; and
the lock pin is configured so as to protrude as being energized by pressure of the fluid on an upstream side of the swing valve, and to retract as being energized by pressure of the fluid on the downstream side of the swing valve.

* * * * *